(12) United States Patent
Oh et al.

(10) Patent No.: US 9,963,211 B2
(45) Date of Patent: May 8, 2018

(54) PROPULSION APPARATUS FOR SHIP AND SHIP HAVING THE SAME

(71) Applicant: SAMSUNG HEAVY IND. CO., LTD., Seoul (KR)

(72) Inventors: Se-Myun Oh, Seoul (KR); Dong-Hyun Lee, Daejeon (KR); Hyun-Sang Park, Geoje-si (KR); Sung-Wook Chung, Geoje-si (KR); Jae-Kwon Jung, Daejeon (KR); Nam-Yong Heo, Tongyeong-si (KR)

(73) Assignee: SAMSUNG HEAVY IND. CO., LTD., Seoul (KR)

( * ) Notice: Subject to any disclaimer, the term of this patent is extended or adjusted under 35 U.S.C. 154(b) by 679 days.

(21) Appl. No.: 14/397,180

(22) PCT Filed: Apr. 26, 2013

(86) PCT No.: PCT/KR2013/003639
§ 371 (c)(1),
(2) Date: Oct. 24, 2014

(87) PCT Pub. No.: WO2013/162328
PCT Pub. Date: Oct. 31, 2013

(65) Prior Publication Data
US 2015/0071780 A1    Mar. 12, 2015

(30) Foreign Application Priority Data

Apr. 27, 2012  (KR) .................. 10-2012-0044768
Apr. 27, 2012  (KR) .................. 10-2012-0044815

(51) Int. Cl.
*B63H 5/10*       (2006.01)
*B63J 3/02*       (2006.01)
(Continued)

(52) U.S. Cl.
CPC ............ *B63H 5/10* (2013.01); *B63J 3/02* (2013.01); *G01K 13/00* (2013.01); *H02K 3/46* (2013.01);
(Continued)

(58) Field of Classification Search
CPC ........................ B63H 5/10; F16C 2233/00
(Continued)

(56) References Cited

U.S. PATENT DOCUMENTS 6,325,687 B1    12/2001  Ungerbuehler
2005/0202734 A1  9/2005  Miller
(Continued)

FOREIGN PATENT DOCUMENTS

JP         59-97316      6/1984
JP         60-18095      2/1985
(Continued)

OTHER PUBLICATIONS

English machine translation of JP 2-155893, Jun. 1990.*
(Continued)

*Primary Examiner* — Christopher Verdier
(74) *Attorney, Agent, or Firm* — Ladas & Parry, LLP

(57) ABSTRACT

Provided are a propulsion device for a ship and a ship including the same. The propulsion device for the ship includes: a rear propeller fixed to a rotation shaft; a front propeller that is rotatably supported on the rotation shaft in the front of the rear propeller; at least one bearing interposed in at least one of spaces between a hub of the front propeller and the rotation shaft and between the rotation shaft and a ship body; and an inverse rotation unit that inverts rotation of the rotation shaft, transfers the inverted rotation to the front propeller and includes a gearbox that is accommodated in an installation space formed in a tail of the ship body in a state in which a plurality of gears for implementing (Continued)

inversion of the front propeller are embedded, wherein at least one measurement unit for measuring operating states of the at least one bearing is mounted to the rotation shaft.

13 Claims, 15 Drawing Sheets

(51) Int. Cl.
*G01K 13/00* (2006.01)
*H02K 3/46* (2006.01)
*H02K 7/116* (2006.01)
*H02K 7/14* (2006.01)
*B63H 23/32* (2006.01)
*B63H 23/34* (2006.01)

(52) U.S. Cl.
CPC ............... *H02K 7/116* (2013.01); *H02K 7/14* (2013.01); *B63H 23/321* (2013.01); *B63H 2005/106* (2013.01); *B63H 2023/323* (2013.01); *B63H 2023/342* (2013.01); *B63H 2023/346* (2013.01); *F16C 2233/00* (2013.01)

(58) Field of Classification Search
USPC .............................. 416/61, 128, 129; 384/448
See application file for complete search history.

(56) References Cited

U.S. PATENT DOCUMENTS

2008/0089786 A1* 4/2008 Sinreich .................. B63H 5/10
416/129

2010/0074567 A1* 3/2010 Giordana .............. G01L 5/0009
384/448
2011/0033296 A1 2/2011 Hideki

FOREIGN PATENT DOCUMENTS

| JP | S62279189 | | | 12/1987 | |
| JP | H02155893 | | | 6/1990 | |
| JP | 02-212293 | A | * | 8/1990 | ............... B63H 5/10 |
| JP | 07-187077 | A | | 7/1995 | |
| JP | 2653508 | B2 | | 9/1997 | |
| JP | 11-72398 | | | 3/1999 | |
| JP | 2000-175498 | | | 6/2000 | |
| JP | 2010-528918 | | | 8/2010 | |
| WO | 95/03211 | | | 2/1995 | |

OTHER PUBLICATIONS

English machine translation of JP 2-212293, Aug. 1990.*
International Search Report for PCT/KR2013/003639 dated Jul. 11, 2013.
Office Action dated Jan. 5, 2016 for Japanese Patent Application No. 2015-508872 and its English machine translation provided by applicant's foreign counsel.
Extended European Search Report dated Mar. 14, 2016 for European Patent Application No. 13782100.5.
International Preliminary Report on Patentability (Chapter II) for PCT/KR2013/003639 dated Jul. 23, 2014 and its English translation provided by WIPO.
Written Opinion of the International Searching Authority for PCT/KR2013/003639 dated Jul. 11, 2013 and its English machine translation by Google translate.

* cited by examiner

PROPULSION APPARATUS FOR SHIP AND SHIP HAVING THE SAME

CROSS-REFERENCE TO RELATED APPLICATIONS

This application is the U.S. National Stage of International Patent Application No. PCT/KR2013/003639, filed on Apr. 26, 2013, which claims priority to Korean Patent Application Nos. 10-2012-0044768, filed on Mar. 27, 2012, and 10-2012-0044815, filed on Mar. 27, 2012, the disclosures of all of which are hereby incorporated by reference in their entireties.

TECHNICAL FIELD

The present invention relates to a propulsion device for a ship, in which two propellers generate a propulsive force while being rotated in opposite directions, and a ship including the same.

BACKGROUND ART

Conventional propulsion devices for ships each include one spiral propeller. However, a propulsion device having one propeller cannot use rotation energy of a waster current caused by rotation of the propeller as a propulsive force and thus has a large energy loss.

A counter rotating propeller (CRP) may recover the rotation energy that is lost in this way as the propulsive force. In the CRP, two propellers installed in the same axial line generate the propulsive force while being rotated in opposite directions. Rotation energy of a fluid that passes through a front propeller is recovered by a rear propeller while the rear propeller is rotated in a reverse direction. Thus, the CRP may have excellent propulsion performance compared to the propulsion device having one propeller.

However, since the CRP includes an inverse rotation unit that implements opposite rotation of two propeller and a hollow shaft, it is relatively difficult to manufacture and install the CRP, and a high technology level is required so that the CRP operates stably while maintaining reliability.

U.S. Patent Laid-open Publication No. US2011/0033296 (published on Feb. 10, 2011) and Japanese Patent Laid-open Publication No. S62-279189 (published on Dec. 4, 1987) each disclose an example of the above-described CRP. U.S. Patent Laid-open Publication No. US2011/0033296 discloses a CRP having an epicyclic gear type inverse rotation unit and a hollow shaft, and Japanese Patent Laid-open Publication No. S62-279189 discloses a CRP in which an epicyclic gear type inverse rotation unit is installed at an end of a ship.

DISCLOSURE

Technical Problem

The present invention is directed to providing a propulsion device for a ship, in which a power transmission system can be simplified compared to the related art, stable mutual inversion of two propellers can be implemented and manufacturing, installation and maintenance of the propulsion device can be easily performed, and a ship including the same.

The present invention is also directed to providing a propulsion device for a ship, in which electric energy is generated by opposite rotation of coils and a magnetic substance installed between a hub of a front propeller and a rotation shaft so as to face each other, and a ship including the same.

Technical Solution

One aspect of the present invention provides a propulsion device for a ship, including: a rear propeller fixed to a rotation shaft; a front propeller that is rotatably supported on the rotation shaft in the front of the rear propeller; at least one bearing interposed in at least one of spaces between a hub of the front propeller and the rotation shaft and between the rotation shaft and a ship body; and an inverse rotation unit that inverts rotation of the rotation shaft, transfers the inverted rotation to the front propeller and includes a gearbox that is accommodated in an installation space formed in a tail of the ship body in a state in which a plurality of gears for implementing inversion of the front propeller are embedded, wherein at least one measurement unit for measuring operating states of the at least one bearing may be mounted to the rotation shaft.

The measurement unit may include: a sensor that measures a change in temperatures of the at least one bearing; and an adaptor in which the sensor is embedded.

The adaptor may be formed of a metallic material having thermal conductivity, may be disposed in a bell mouth shape, may be mounted in a coupling groove formed in the rotation shaft or may be disposed as an integral body with the rotation shaft.

The propulsion device may further include a connection cable that is connected to the sensor and transfers measurement values of the change in temperatures of the at least one bearing to an outside.

The propulsion device may further include: a communication unit that receives the measurement values of the change in temperatures of the at least one bearing from the sensor; a determination unit that determines whether operations of the at least one bearing are maintained in a normal state based on the received measurement values of the change in temperatures of the at least one bearing; and a display unit that displays at least one of the measurement values of the change in temperatures of the at least one bearing and a value of the determination result on a screen.

The at least one bearing may include: first and second thrust bearings that support thrust loads applied to the rotation shaft from the front propeller; a first radial bearing that supports a radial load applied to the rotation shaft from the front propeller; a second radial bearing that is respectively installed between the rotation shaft and the ship body and supports the rotation shaft in the front of the gearbox; and at least one of third and fourth thrust bearings that transfer axial forces transferred from the front propeller and the rear propeller to the rotation shaft toward the ship body.

The propulsion device may further include a generator unit that includes coils and a magnetic substance installed between the hub of the front propeller and the rotation shaft so as to face each other and that generates electric energy due to opposite rotation of the coils and the magnetic substance when the rotation shaft rotates, wherein the electric energy may be supplied as an energy source of the measurement unit.

The magnetic substance may include at least one of a permanent magnet and an electromagnet.

The propulsion device may further include a cylindrical, first outer support ring and a cylindrical, first inner support ring that are respectively installed between the hub of the front propeller and the rotation shaft, wherein the first outer support ring may be interposed between an outer race of the second thrust bearing and an outer race of the first radial bearing so that the second thrust bearing and the first radial bearing can be supported with respect to each other, and the first inner support ring may be interposed between an inner race of the second thrust bearing and an inner race of the first radial bearing so that the second thrust bearing and the first radial bearing can be supported with respect to each other.

The plurality of gears may include: a driving bevel gear connected to the gearbox so as to be rotated together with the rotation shaft; a driven bevel gear that is rotatably supported around the rotation shaft and is connected to the hub of the front propeller; and at least one inversion bevel gear that inverts rotation of the driving bevel gear and transfers inverted rotation to the driven bevel gear.

The propulsion device may further include: a connection member that is rotatably supported on an outer side of the rotation shaft and connects the driven bevel gear and the hub of the front propeller; and a rear inner bearing installed between an inner surface of the connection member and the rotation shaft.

The propulsion device may further include a cylindrical, second inner support ring and a cylindrical, second outer support ring that are disposed between the connection member and the outer surface of the rotation shaft and support the rear inner bearing, wherein the second inner support ring may be interposed between an inner race of the rear inner bearing and an inner race of the first thrust bearing and maintains a distance therebetween, and the second outer support ring may be installed at an inner surface of the connection member so as to support an outer race of the rear inner bearing.

The coils may be wound along an outer circumferential surface and an inner circumferential surface of the first inner support ring, and the magnetic substance may be installed at an inside of the first outer support ring so as to face the coils.

The coils may be wound along an outer circumferential surface and an inner circumferential surface of the second inner support ring, and the magnetic substance may be installed at an inside of the second outer support ring so as to face the coils.

Another aspect of the present invention provides a ship including the above-described propulsion device.

Advantageous Effects

As described above, in a propulsion device according to the one or more embodiments of the present invention, a gearbox of an inverse rotation unit can be mounted to enter an installation space formed in a tail of a ship body in a state in which the inverse rotation unit is fabricated outside the ship body and is assembled, so that fabrication and installation can be easily performed.

In addition, electric energy generated by opposite rotation of coils and a magnetic substance that are installed between a hub of a front propeller and a rotation shaft so as to face each other can be utilized as an energy source of various equipment within a ship.

In addition, a measurement unit for monitoring operating states of bearings that are interposed in at least one of spaces between the hub of the front propeller and the rotation shaft and between the rotation shaft and the ship body is mounted to the rotation shaft so that rapid action can be taken based on the result of monitoring.

Furthermore, the electric energy generated by opposite rotation of the coils and the magnetic substance that are installed between the hub of the front propeller and the rotation shaft so as to face each other is used as an energy source of the measurement unit so that operating states of the bearings that are interposed in least one of spaces between the hub of the front propeller and the rotation shaft and between the rotation shaft and the ship body can be continuously monitored.

MODES OF THE INVENTION

Hereinafter, embodiments of the present invention will be described with reference to the attached drawings in detail.

Figure 1:
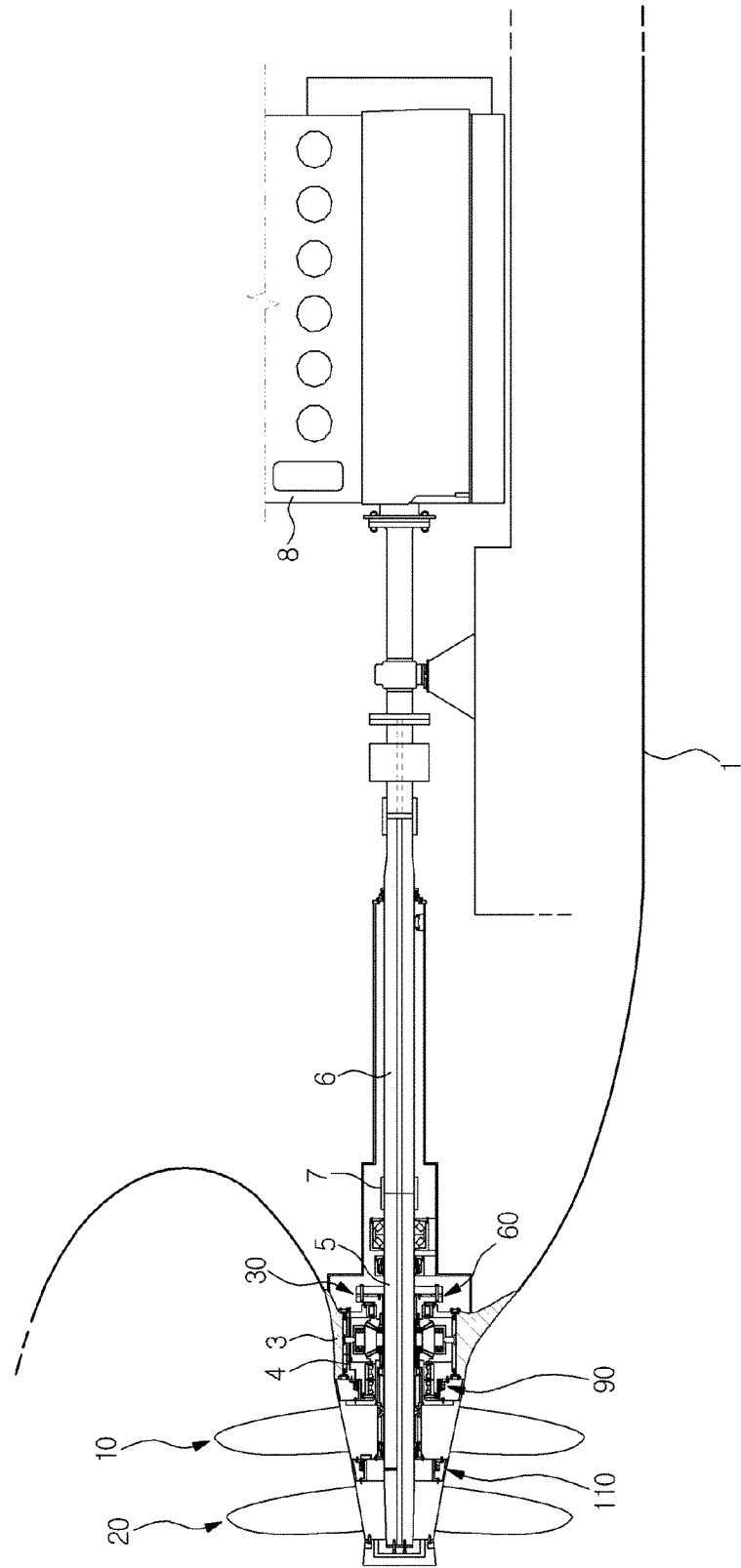
FIG. 1 is a cross-sectional view of a state in which a propulsion device according to an embodiment of the present invention is applied to a ship.
Figure 2:
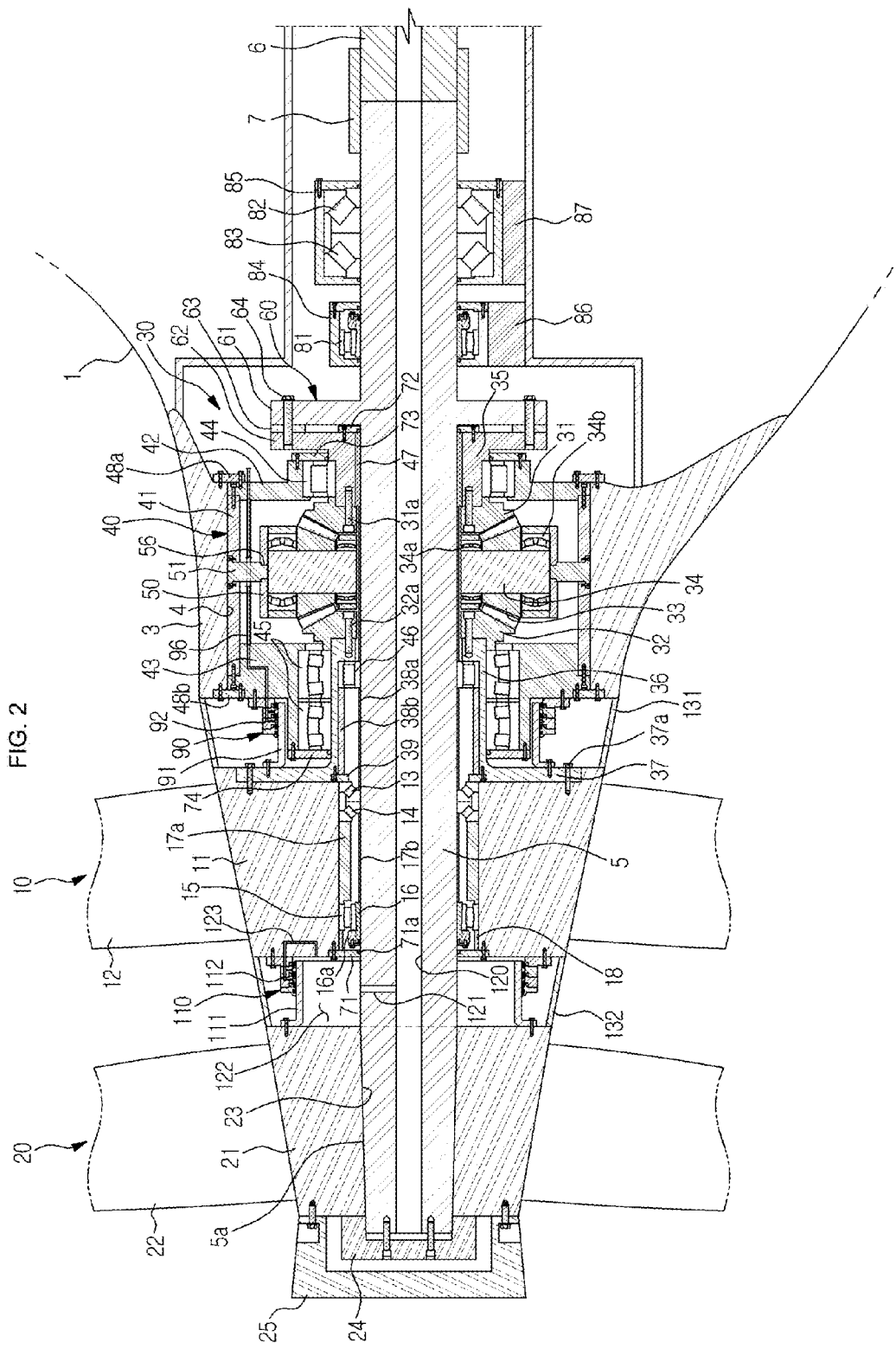
FIG. 2 is a cross-sectional view of the propulsion device according to an embodiment of the present invention.

As illustrated in FIGS. 1 and 2, a propulsion device for a ship according to an embodiment of the present invention includes a front propeller 10 and a rear propeller 20 that are disposed in the rear of a ship body 1 so that axial lines of the front propeller 10 and the rear propeller 20 coincide with each other, and an inverse rotation unit 30 that is installed at a tail 3 of the ship body 1 so as to implement opposite rotation of the front propeller 10 and the rear propeller 20. That is, the propulsion device for the ship is a counter rotating propeller (CRP) in which two propellers 10 and 20 generate a propulsive force while being rotated in opposite directions.

Here, the tail 3 of the ship body 1 refers to a Stern boss that protrudes in a streamlined form rearward from the ship body 1 so that the front and rear propellers 10 and 20 and the inverse rotation unit 30 can be installed at the ship body 1. The tail 3 of the ship body 1 may be fixed to the ship body 1 by welding after the tail 3 is manufactured in a casting form. Also, the tail 3 of the ship body 1 includes an installation space 4 that is perforated in front and rear directions so that a gearbox 40 of the inverse rotation unit 30 that will be described later can be accommodated in the installation space 4. An inner surface of the installation space 4 may be processed in a cylindrical form by boring so as to correspond to an exterior of the gearbox 40.

Figure 3:
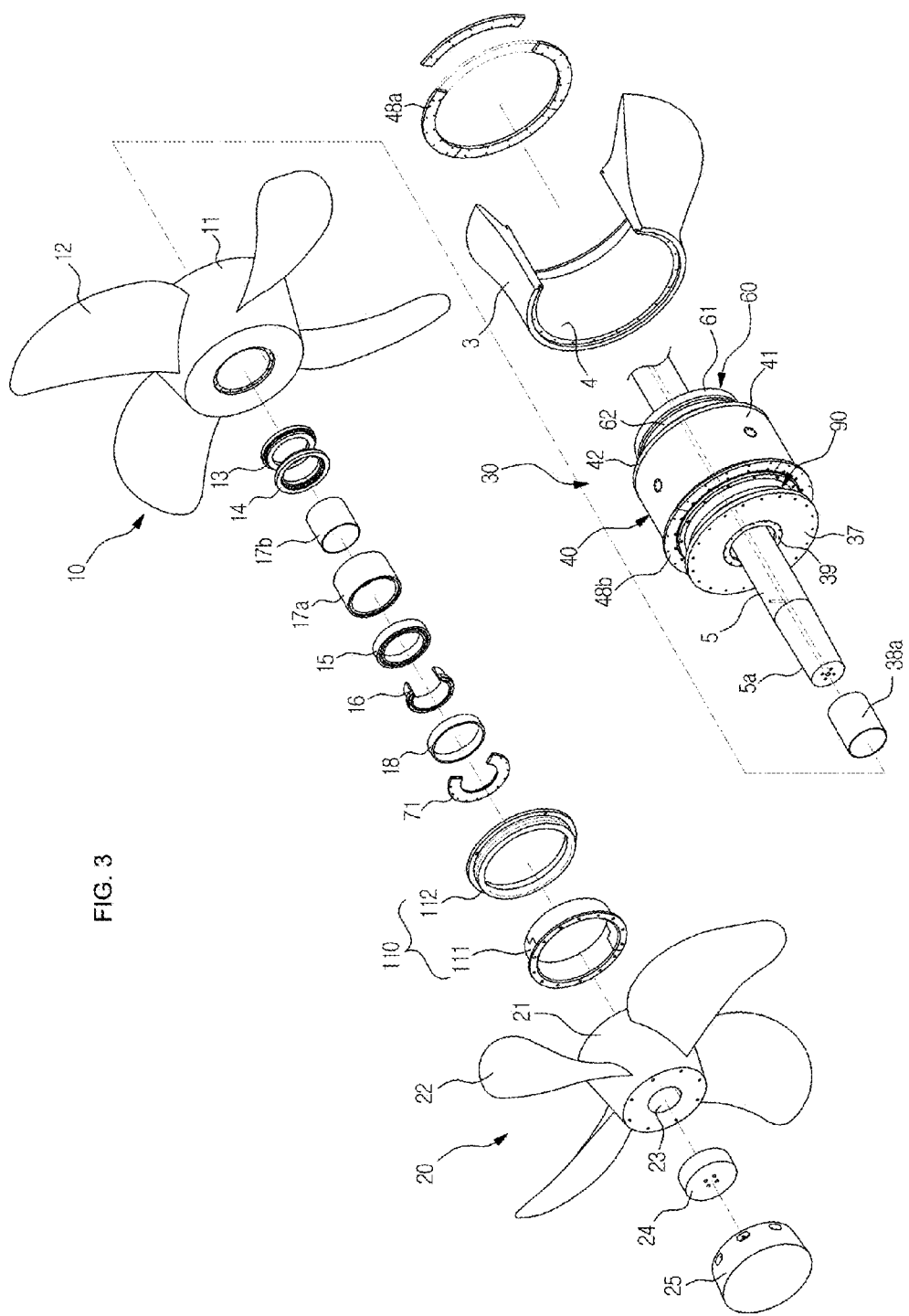
FIG. 3 is an exploded perspective view of the propulsion device according to an embodiment of the present invention.

As illustrated in FIGS. 2 and 3, the inverse rotation unit 30 includes the gearbox 40 accommodated in the installation space 4 of the tail 3 of the ship body 1 and a rotation shaft 5 that is rotatably supported in the gearbox 40 in a state in which the rotation shaft 5 is perforated into an approximately central portion of the gearbox 40.

Figure 4:
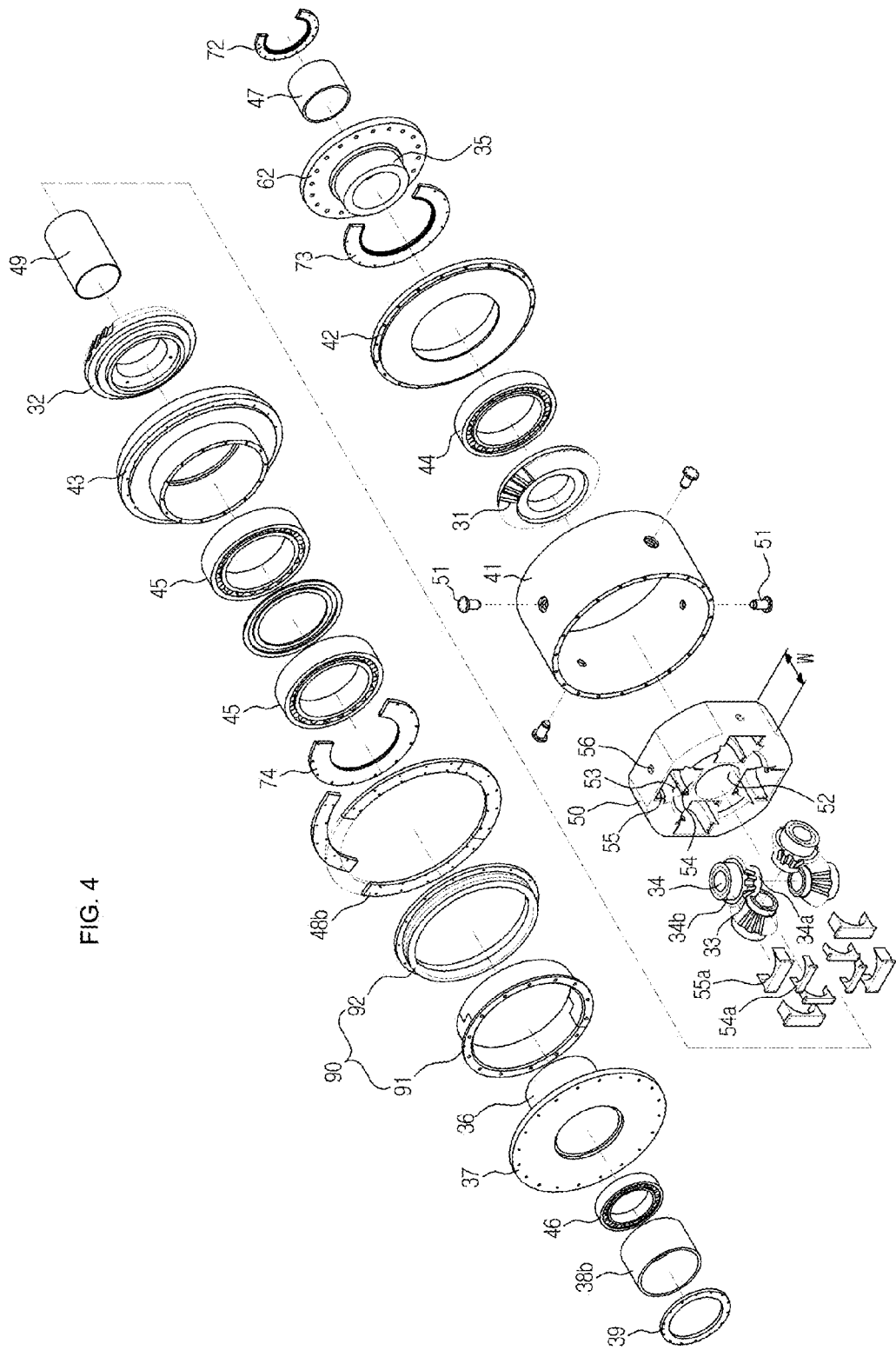
FIG. 4 is an exploded perspective view of an inverse rotation unit of the propulsion device according to an embodiment of the present invention.

As illustrated in FIGS. 2 through 4, the inverse rotation unit 30 includes a driving bevel gear 31 installed in the gearbox 40 so as to be rotated together with the rotation shaft 5, a driven bevel gear 32 that is rotatably supported at the rotation shaft 5 inside the gearbox 40 so as to face the driving bevel gear 31, and a plurality of inversion bevel gears 33 that invert rotation of the driving bevel gear 31 and transfers the inverted rotation to the driven bevel gear 32. Also, the inverse rotation unit 30 may include a cylindrical, first connection member 35 that connects the rotation shaft 5 and the driving bevel gear 31 and a cylindrical, second connection member 36 that connects the driven bevel gear 32 and a hub 11 of the front propeller 10.

The rotation shaft 5 may be connected to a main driving shaft 6 so that a front end of the rotation shaft 5 that protrudes in the front of the gearbox 40 can be separated from or coupled to the main driving shaft 6 inside the ship body 1. The main driving shaft 6 is connected to a driving source 8 (a diesel engine, a motor, a turbine, and so on) installed in the ship body 1 so that the rotation shaft 5 can be rotated together with the main driving shaft 6, as illustrated in FIG. 1.

The rear propeller 20 is fixed to the rotation shaft 5 that extends toward the rear of the gearbox 40, and the front propeller 10 is rotatably supported at an outer surface between the rear propeller 20 and the gearbox 40. Although will be described later in more detail, the front propeller 10 may be connected to the inverse rotation unit 30 and thus may be rotated in an opposite direction to a direction of the rear propeller 20 when the rotation shaft 5 rotates.

The main driving shaft 6 and the rotation shaft 5 may be connected to be separated from or coupled to each other using a spline shaft coupling method by a cylindrical coupling unit 7. Although spline shaft coupling is illustrated as an example, a connection method of the main driving shaft 6 and the rotation shaft 5 is not limited thereto. A flange coupling method, a friction clutch method, and a magnetic clutch method may be selectively adopted.

The rear propeller 20 is fixed to a tail 5a of the rotation shaft 5 so as to be rotated together with the rotation shaft 5, as illustrated in FIGS. 2 and 3. The rear propeller 20 includes a hub 21 fixed to the rotation shaft 5 and a plurality of wings 22 disposed at an outer surface of the hub 21. The hub 21 of the rear propeller 20 may be fixed to the rotation shaft 5 so that a shaft coupling hole 23 of a central portion of the hub 21 can be forcibly inserted into an outer surface of the rotation shaft 5. A fixing cap 24 is fastened to a rear end of the rotation shaft 5 so that the rear propeller 20 can be more solidly fixed to the rotation shaft 5.

For this coupling, the tail 5a of the rotation shaft 5 may be provided as a tapered outer surface of which outer diameter is decreased rearward, and the shaft coupling hole 23 of the hub 21 may be configured of a tapered inner surface that corresponds to the outer surface of the rotation shaft 5. In FIG. 2, reference numeral 25 is a propeller cap mounted on the hub 21 so as to cover a rear surface of the hub 21 of the rear propeller 20 and the fixing cap 24.

The front propeller 10 is rotatably installed at the outer surface of the rotation shaft 5 between the rear propeller 20 and the inverse rotation unit 30. The front propeller 10 includes a hub 11 that is rotatably supported at the outer surface of the rotation shaft 5, and a plurality of wings 12 disposed at the outer surface of the hub 11. The front propeller 10 may be installed at the outer surface of the rotation shaft 5 before the rear propeller 20 is installed. Also, since the front propeller 10 is rotated in an opposite direction to the direction of the rear propeller 20, a wing angle of the front propeller 10 is opposite to that of the rear propeller 20.

Figure 5:
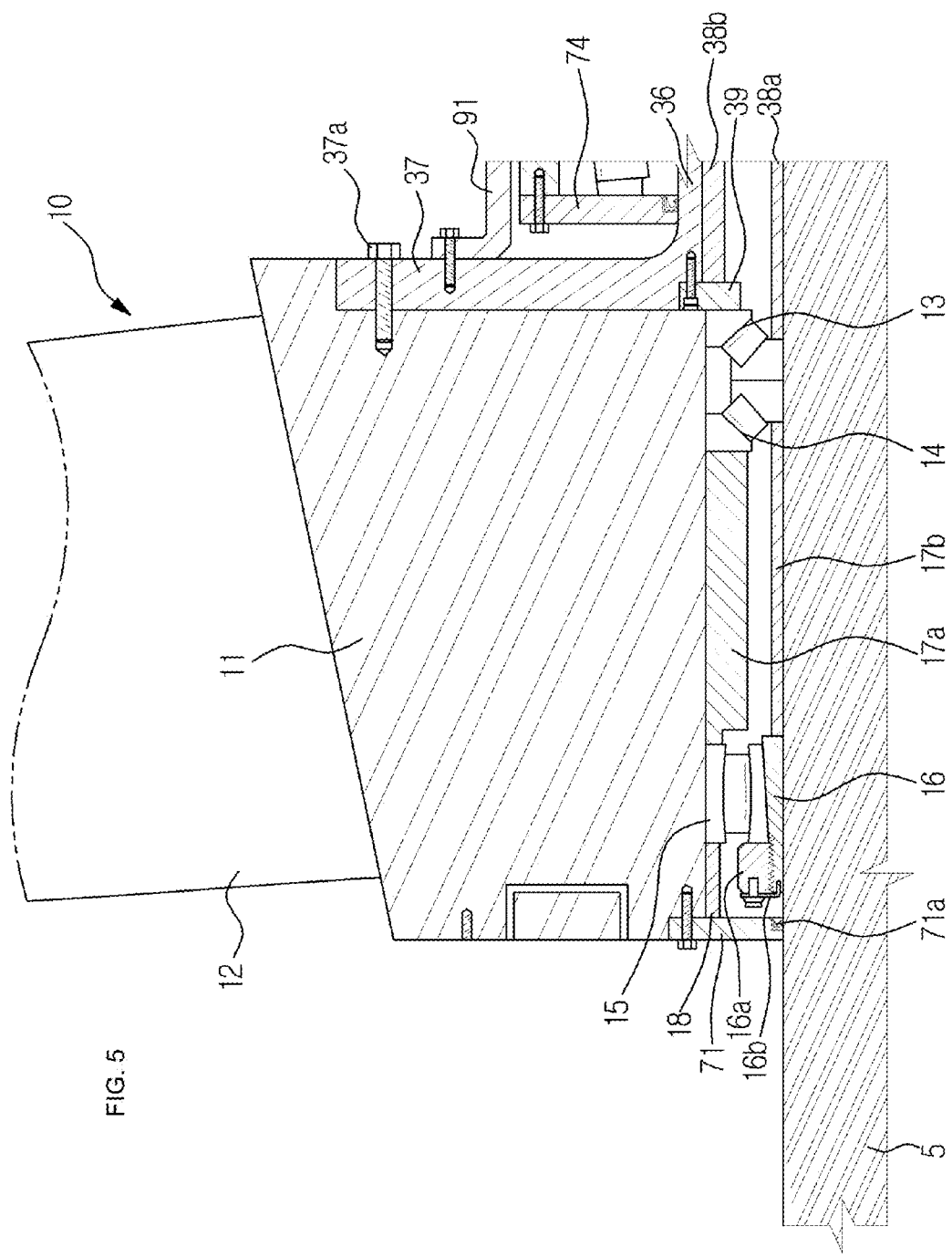
FIG. 5 is a detailed cross-sectional view of a mounting structure of bearings that support a front propeller of the propulsion device according to an embodiment of the present invention.

The hub 11 of the front propeller 10 may be rotatably supported at the outer surface of the rotation shaft 5 by using a first thrust bearing 13, a second thrust bearing 14, and a first radial bearing 15, as illustrated in FIGS. 2 and 5. The first thrust bearing 13 and the second thrust bearing 14 may be installed between an inner surface toward the front of the hub 11 and the outer surface of the rotation shaft 5, and the first radial bearing 15 may be installed between an inner surface toward the rear of the hub 11 and the outer surface of the rotation shaft 5.

The first radial bearing 15 may bear a radial load of the front propeller 10 that exerts in a radial direction of the rotation shaft 5, and the first and second thrust bearings 13 and 14 may bear thrust loads that respectively exert on the rotation shaft 5 in front and rear axial directions. In detail, the second thrust bearing 14 may bear a thrust load that exerts on the head of the ship body 1 from the front propeller 10 when a ship moves forward, and the first thrust bearing 13 may bear a thrust load that exerts on the tail of the ship body 1 from the front propeller 10 when the ship moves astern.

An inner race of the first thrust bearing 13 and an inner race of the second thrust bearing 14 may be supported not to be pushed in the front and rear axial directions in such a way that the first thrust bearing 13 and the second thrust bearing 14 are disposed to contact each other in a state in which they are forcibly inserted into the outer surface of the rotation shaft 5, as illustrated in FIG. 5. An outer race of the first thrust bearing 13 may be supported by a fixing ring 39 mounted on the second connection member 36 coupled to the hub 11.

A first support ring 17a and a second support ring 17b each having a cylindrical shape may be respectively installed between the hub 11 of the front propeller 10 and the rotation shaft 5 so that the second thrust bearing 14 cannot be pushed in the front and rear axial directions. The first support ring 17a may be interposed between an outer race of the second thrust bearing 14 and an outer race of the first radial bearing 15 so that they can be supported with respect to each other, and the second support ring 17b may be interposed between the inner race of the second thrust bearing 14 and an inner race of the first radial bearing 15 so that they can be supported with respect to each other. Also, a distance adjusting ring 18 may be installed at an inner surface of the hub 11 between an outer race of the first radial bearing 15 and the hub 11 of the first sealing cover 71 that will be described later so that the outer race of the first radial bearing 15 cannot be pushed in the front and rear axial directions. Here, the distance adjusting ring 18 has been installed so as to more stably support the outer race of the first radial bearing 15. However, when the outer race of the first radial bearing 15 is forcibly inserted into the inner surface of the hub 11, even though no distance adjusting ring 18 is installed, the outer race of the first radial bearing 15 may be fixed such that the distance adjusting ring 18 can be selectively adopted according to a design.

The inner race of the first radial bearing 15 may be fixed such that a cylindrical wedge member 16 is mounted between the inner race of the first radial bearing 15 and the outer surface of the rotation shaft 5 and thus the first radial bearing 15 is not pushed in the front and rear axial directions, as illustrated in FIG. 5. The wedge member 16 includes a tapered outer surface of which outer diameter is decreased rearward and a screw thread formed on the outer surface rearward of the wedge member 16, and an inner surface of the wedge member 16 may be forcibly inserted into and fixed to the outer surface of the rotation shaft 5. A tightening nut 16a may be fastened to the screw thread rearward of the wedge member 16 so as to confine the inner race of the first radial bearing 15. Thus, the first radial bearing 15 may be solidly between the outer surface of the rotation shaft 5 and the inner surface of the hub 11. A fixing clip 16b may be fastened to the wedge member 16 and the tightening nut 16a so as to prevent the fixing clip 16b from being loosened.

Figure 6:
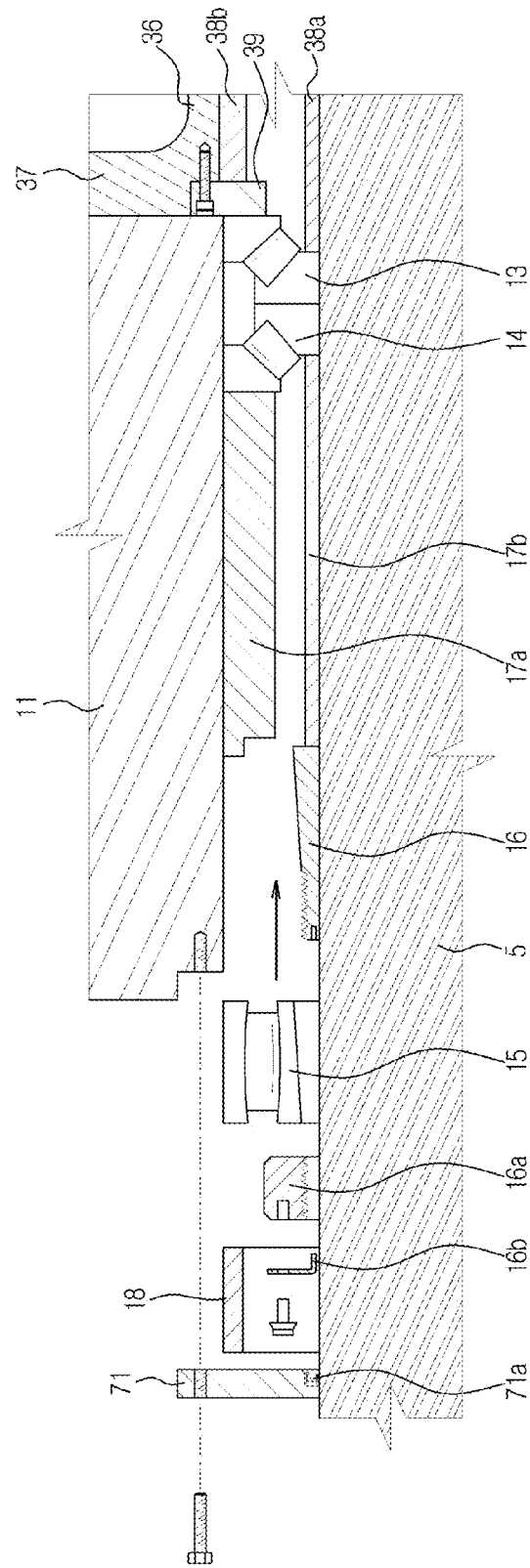
FIG. 6 is a detailed cross-sectional view of a mounting structure of bearings that support a front propeller of the propulsion device according to an embodiment of the present invention, which illustrates a state in which a first radial bearing is separated from the propulsion device.

When the front propeller 10 is installed, first, the first thrust bearing 13, the second thrust bearing 14, the first and second support rings 17a and 17b, and the wedge member 16 may be sequentially installed at the outer surface of the rotation shaft 5. Next, as illustrated in FIG. 6, the hub 11 of the front propeller 10 may be coupled to an outer side of the rotation shaft 5 so that the inner surface of the hub 11 can be coupled to the outer races of the first and second thrust bearings 13 and 14. Subsequently, after the first radial bearing 15 is pushed into and installed between the outer surface of the wedge member 16 and the inner surface of the hub 11, the tightening nut 16a may be fastened to the wedge member 16 so as to fix the inner race of the first radial bearing 15. After the first radial bearing 15 has been installed, the distance adjusting ring 18 may be installed, and the first sealing cover 71 may be mounted.

In this way, if the first radial bearing 15 is fixed using the wedge member 16, a manufacturing error occurs in parts, such as the first and second support rings 17a and 17b. Even when an installation position of the first radial bearing 15 changes, mounting positions of the wedge member 16 and the first radial bearing 15 are adjusted so that a coupling error can be corrected. That is, since the first radial bearing 15 can be fixed in a state in which the wedge member 16 and the first radial bearing 15 are in close contact with the first and second support rings 17a and 17b, a coupling error between parts can be minimized. After a distance between the outer race of the first radial bearing 15 and the first sealing cover 71 in a state in which the first radial bearing 15 is mounted, is measured, the distance adjusting ring 18 may be manufactured and installed to be suitable for the measured distance.

When the front propeller 10 is separated from the rotation shaft 5 for further troubleshooting, contrary to this, the first sealing cover 71 and the distance adjusting ring 18 are separated from each other and the tightening nut 16a fastened to the wedge member 16 is loosened so that the first radial bearing 15 can be separated from the propulsion device, the front propeller 10 may be pulled rearward and separated from the propulsion device. After the front propeller 10 is separated from the propulsion device, the first and second thrust bearings 13 and 14, the wedge member 16, and the first and second support rings 17a and 17b are exposed so that they can also be easily separated from the rotation shaft 5.

Figure 7:
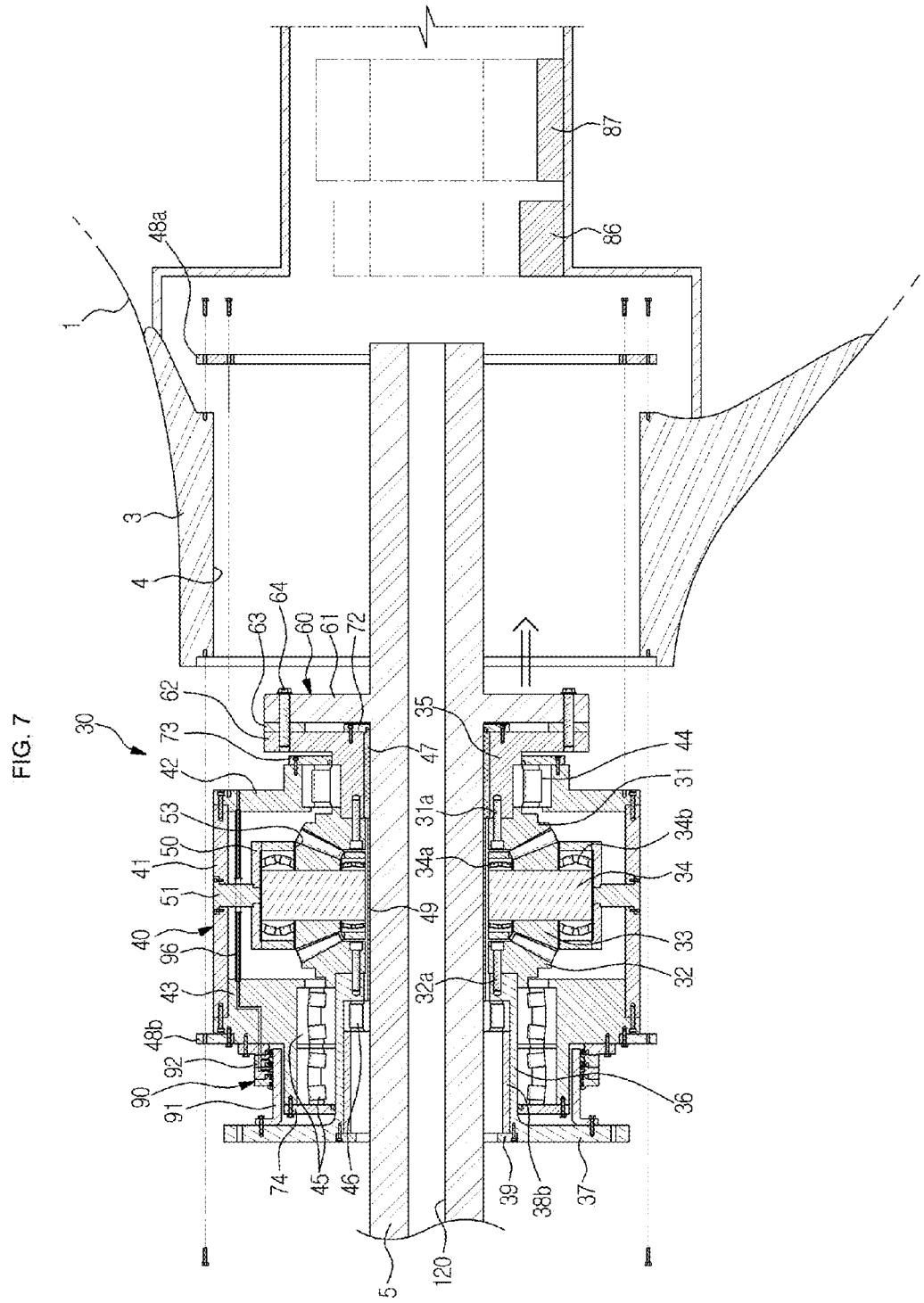
FIG. 7 is a cross-sectional view of an example in which the inverse rotation unit of the propulsion device according to an embodiment of the present invention is mounted, which illustrates a state in which the inverse rotation unit is separated from the propulsion device.

The gearbox 40 of the inverse rotation unit 30 may include a cylindrical body portion 41 in which the driving bevel gear 31, the driven bevel gear 32 and the plurality of inversion bevel gears 33 are accommodated and which has open both ends, a front cover 42 coupled to the body portion 41 so as to close an opening toward the front of the body portion 41, and a rear cover 43 coupled to the body portion 41 so as to close an opening toward the rear of the body portion 41, as illustrated in FIGS. 2, 4, and 7.

The front cover 42 may rotatably support the first connection member 35 that perforates a central part of the front cover 42, and the rear cover 43 may also rotatably support the second connection member 36 that perforates a central part of the rear cover 43. To this end, a front bearing 44 may be installed between an outer surface of the first connection member 35 and the front cover 42, and a rear outer bearing 45 may be installed between an outer surface of the second connection member 36 and the rear cover 43.

A plurality of rear outer bearings 45 are continuously installed in a lengthwise direction of the rotation shaft 5 so that the second connection member 36 can be rotated in a state in which it is stably supported. A rear inner bearing 46 may be installed between an inner surface of the second connection member 36 and the rotation shaft 5 so as to rotatably support the second connection member 36, and a cylindrical sleeve bearing 47 may be installed between the first connection member 35 and the outer surface of the rotation shaft 5. Also, a cylindrical separation ring 49 may be installed at the outer surface of the rotation shaft 5 between an inner race of the rear inner bearing 46 and the sleeve bearing 47 so as to support the rear inner bearing 46 and the sleeve bearing 47.

All of the front bearing 44, the rear outer bearing 45, and the rear inner bearing 46 may be configured of radial bearings. These bearings 44, 45, and 46 may support radial loads that exert on the rotation shaft 5, the first connection member 35, and the second connection member 36 and simultaneously may implement stable rotation thereof.

The driving bevel gear 31 is connected to the first connection member 35 so as to be rotated together with the first connection member 35 by fastening a plurality of fixing bolts 31a. The driven bevel gear 32 is also connected to the second connection member 36 by fastening a plurality of fixing bolts 32a. An inner diameter of the driven bevel gear 32 may be spaced apart from the rotation shaft 5 so that, when the driven bevel gear 32 is rotated, it is not interfered with the rotation shaft 5.

The plurality of inversion bevel gears 33 are interposed between the driving bevel gear 31 and the driven bevel gear 32 in a state in which the inversion bevel gears 33 engage with each other. A shaft 34 that supports each of the inversion bevel gears 33 may be disposed in a direction in which the shaft 34 crosses the rotation shaft 5 (radial direction of the rotation shaft 5), and a plurality of shafts 34 may be disposed in a radial form around the rotation shaft 5. Also, bearings 34a and 34b may be installed on both ends of the shaft 34 of each inversion bevel gear 33 so that the shaft 34 can be smoothly rotated.

An inner frame 50 may be installed in the gearbox 40 so that the inversion bevel gears 33 can be installed at the inner frame 50. The inner frame 50 may be fixed into the body portion 41 by fastening a plurality of fixing members 51 in a state in which the inner frame 50 enters the gearbox 40.

A through hole 52 through which the rotation shaft 5 passes, may be formed in a central part of the inner frame 50, and the inner frame 50 may have a cylindrical or polyprism shape in which a width W (lengthwise width of the rotation shaft 5) of the inner frame 50 is smaller than a maximum outer diameter of each inversion bevel gear 33, as illustrated in FIG. 4. The inner frame 50 includes a plurality of gear installation portions 53 in which each inversion bevel gear 33 is rotatably accommodated and which have open both sides so that the inversion bevel gears 33 can engage with the driving and driven bevel gears 31 and 32. Also, the inner frame 50 includes a first shaft support portion 54 and a second shaft support portion 55 that are disposed to support bearings 34a and 34b installed at both ends of the shaft 34 of each inversion bevel gear 33. A plurality of configurations described above may be disposed in the radial form around the through hole 52 so that the plurality of inversion bevel gears 33 can be installed.

The first shaft support portion 54 and the second shaft support portion 55 may be disposed to be open in one side direction of the inner frame 50 so that the shaft 34 of each inversion bevel gear 33 can be mounted, as illustrated in FIG. 4. A first fastening member 54a and a second fastening member 55a may be mounted on the first shaft support portion 54 and the second shaft support portion 55 so as to cover and fix the bearings 34a and 34b. Thus, each inversion bevel gear 33 is installed at the inner frame 50 in such a way that, in a state in which the inversion bevel gears 33, the shaft 34 of each inversion bevel gear 33 and the bearings 34a and 34b are assembled, this assembly enters the plurality of gear installation portions 53 from one side direction of the inner frame 50 and then, the first and second fastening members 54a and 55a can be fastened and fixed. Here, this is merely an illustrative example for a method of mounting the inversion bevel gears 33 on the inner frame 50, and the method of mounting the inversion bevel gears 33 is not limited thereto. When the shape of the inner frame 50 is modified, the method of mounting the inversion bevel gears 33 on the inner frame 50 may also be modified.

The inner frame 50 on which the inversion bevel gears 33 are mounted, may enter an inside of the body portion 41 of the gearbox 40 before the driving bevel gear 31, the driven bevel gear 32, the front cover 42 and the rear cover 43 are installed while the inverse rotation unit 30 is assembled, and then, the inner frame 50 may be fixed into the body portion 41 by fastening the plurality of fixing members 51.

The plurality of fixing members 51 may be disposed in a cylindrical pin form, as illustrated in FIGS. 4 and 7. These fixing members 51 are installed to pass through the body portion 41 from an outside of the body portion 41 and to enter the inside of the body portion 41 so that the inner frame 50 in a fixed state can be supported by inner ends of the fixing members 51. The inner ends of the fixing members 51 may enter a fixing groove 56 formed in a circumference of the inner frame 50 and may be bonded to the inner frame 50. Outer ends of the fixing members 51 may be fixed to the body portion 41 by fastening fixing screws.

In the gearbox 40, after an inversion bevel gear assembly including the inner frame 50 is mounted into the body portion 41, the driving bevel gear 31 and the driven bevel gear 32 may be installed through the openings in both sides of the body portion 41, and subsequently, parts, such as the front cover 42, the rear cover 43, the first connection member 35, and the second connection member 36, may be installed. Thus, the inverse rotation unit 30 can be easily assembled, and further troubleshooting can be easily performed.

In the current embodiment, the inverse rotation unit 30 includes a plurality of inversion bevel gears 33. However, the inversion bevel gear 33 need not to be limited to a plurality of inversion bevel gears 33, because the inversion bevel gear 33 has only to invert rotation of the driving bevel gear 31 into the driven bevel gear 32 and transfer inverted rotation to the driven bevel gear 32. A small ship having no large driving load may implement its function by using only one inversion bevel gear.

Also, the inverse rotation unit 30 includes a power connection unit 60 that connects the rotation shaft 5 and the first connection member 35 so as to be separated from each other, as illustrated in FIGS. 2 and 7. The power connection unit 60 may include a driving flange 61 disposed on the rotation shaft 5 in the front of the gearbox 40, a driven flange 62 disposed on the first connection member 35 so as to face the driving flange 61, a frictional member 63 interposed between the driving flange 61 and the driven flange 62, and a plurality of connection bolts 64 that fasten the driving flange 61, the driven flange 62 and the frictional member 63 in a perforation manner. The driving flange 61 may be integrally disposed on the rotation shaft 5 or may be fixed to the rotation shaft 5 by welding after the driving flange 61 is separately manufactured. The driven flange 62 may be disposed integrally with the first connection member 35. The frictional member 63 may have a shape in which a plurality of frictional members 63 are divided in a semicircular shape, such that the frictional member 63 can be removed by loosening the plurality of connection bolts 64 and then can be separated from the power connection unit 60 outwards in a radial direction of the frictional member 63.

The power connection unit 60 may block power connection of the driving flange 61 and the driven flange 62 by separating the frictional member 63 from the power connection unit 60 by loosening the plurality of connection bolts 64 if necessary. For example, when a problem occurs in the inverse rotation unit 30 while sailing of the ship, the power connection unit 60 may block power transmission from the rotation shaft 5 to the first connection member 35. In this case, the ship may sail by operating only the rear propeller 20.

The second connection member 36 includes a connection flange 37 that is disposed at a rear end of the second connection member 36 and is connected to the hub 11 of the front propeller 10. The connection flange 37 may be disposed integrally with the second connection member 36 and may be fixed to a front surface of the hub 11 of the front propeller 10 by fastening the plurality of fixing bolts 37a. Thus, rotation of the driven bevel gear 32 may be transferred to the front propeller 10 by using the second connection member 36.

Cylindrical, third and fourth support rings 38a and 38b that support the rear inner bearing 46 may be installed between the second connection member 36 and the outer surface of the rotation shaft 5. The third support ring 38a may be interposed between the inner race of the rear inner bearing 46 and the inner race of the first thrust bearing 13 and may maintain a distance therebetween. The fourth support ring 38*b* may be installed at an inner surface of the second connection member 36 so as to support an outer race of the rear inner bearing 46. The fixing ring 39 may be mounted on a rear end of the second connection member 36 so as to prevent escape of the fourth support ring 38*b*. The fixing ring 39 may support the outer race of the first thrust bearing 13, as illustrated in FIGS. 2 and 5.

The first connection member 35 of the inverse rotation unit 30 is rotated when the rotation shaft 5 is rotated, and the driving bevel gear 31 of the inverse rotation unit 30 connected to the first connection member 35. Since rotation of the driving bevel gear 31 is inverted by the plurality of inversion bevel gears 33 and then is transferred to the driven bevel gear 32, the driven bevel gear 32 is rotated in an opposite direction to that of the driving bevel gear 31. Rotation of the driven bevel gear 32 is transferred to the front propeller 10 by using the second connection member 36. Thus, opposite rotation of the front propeller 10 and the rear propeller 20 can be implemented.

In this way, the inverse rotation unit 30 of the current embodiment implements mutual inversion of two propellers 10 and 20 by using the plurality of bevel gears 31, 32, and 33 and thus, the volume of the inverse rotation unit 30 can be reduced compared to a conventional epicyclic gear type inverse rotation unit. Thus, the volume of the gearbox 40 installed at the tail 3 of the ship body 1 can be minimized.

Since the conventional epicyclic gear type inverse rotation unit includes a solar gear installed on a rotation shaft, an epicyclic gear installed at an outside of the solar gear and a cylindrical, internal gear installed at an outside of the epicyclic gear, the volume of the conventional epicyclic gear type inverse rotation unit is relatively large. Also, in the conventional epicyclic gear type inverse rotation unit, the internal gear disposed at the outermost portion of the epicyclic gear type inverse rotation unit need to be rotated. Thus, the volume of the conventional epicyclic gear type inverse rotation unit is greatly increased in consideration of a casing thereof. Thus, like in the current embodiment, in actuality, it is very difficult to install the epicyclic gear type inverse rotation unit at the tail 3 of the ship body 1. Even if the epicyclic gear type inverse rotation unit is installed at the tail 3 of the ship body 1, the size of the tail 3 of the ship body 1 need to be increased.

Also, the propulsion device of the current embodiment includes a first sealing unit 90 that seals the tail 3 of the ship body 1 and the hub 11 of the front propeller 10 so as to prevent invasion of sea water (or fresh water) or foreign substances and a second sealing unit 110 that seals the hub 11 of the front propeller 10 and the hub 21 of the rear propeller 20 for the same purpose, as illustrated in FIG. 2.

Figure 9:
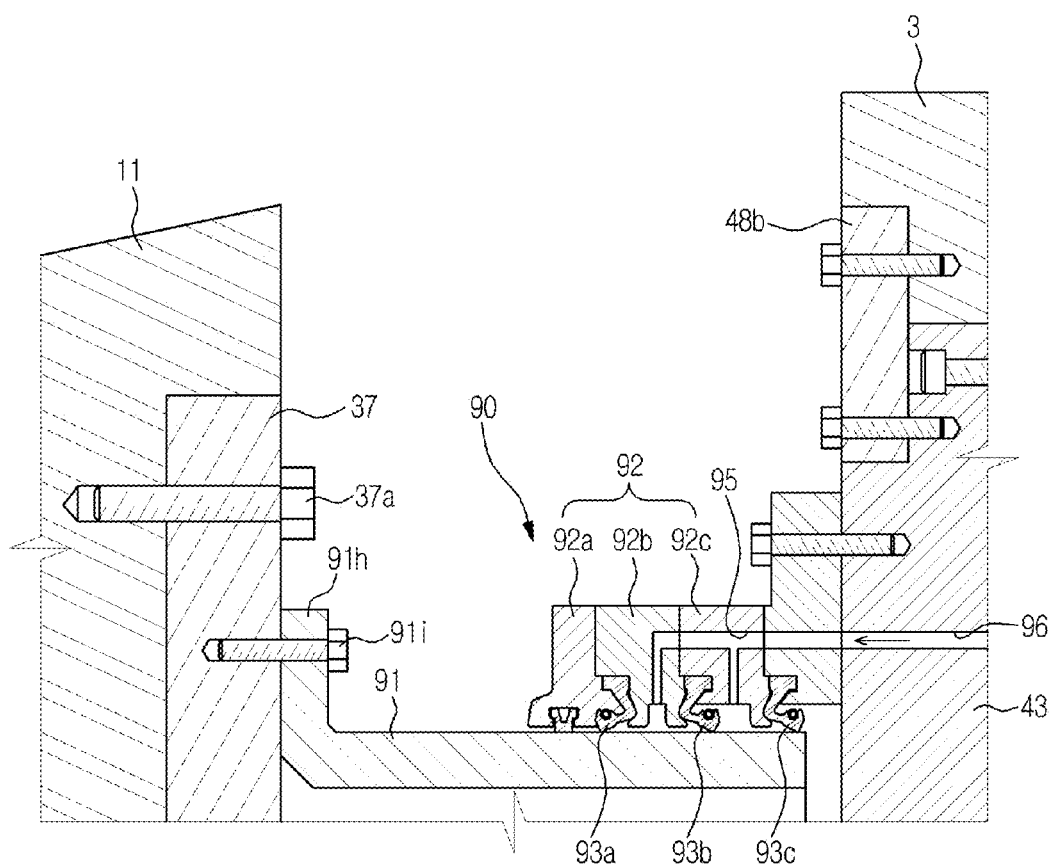
FIG. 9 is a cross-sectional view of a first sealing unit of the propulsion device according to an embodiment of the present invention.

The first sealing unit 90 may include a cylindrical, first lining 91 installed at a connection flange 37 of a second connection member 36 fixed to the front surface of the hub 11 of the front propeller 10 and a cylindrical, first sealing member 92 that covers and contacts an outer surface of the first lining 91 and has one end fixed to the rear cover 43, as illustrated in FIG. 9.

The first sealing member 92 includes a plurality of packings 93*a*, 93*b*, and 93*c* that are installed on an inner surface of the first sealing member 92 that faces the first lining 91 so as to be spaced apart from one another and that contact the outer surface of the first lining 91, and a flow path 95 on which a fluid for sealing is supplied into grooves among these packings 93*a*, 93*b*, and 93*c*. The flow path 95 of the first sealing member 92 may be connected to a lubricant supplying flow path 96 that passes through the front and rear covers 42 and 43 of the gearbox 40 so that a lubricant having a predetermined pressure can be supplied to the grooves among the packings 93*a*, 93*b*, and 93*c* (see FIG. 2). The lubricant having the predetermined pressure is supplied into the grooves among the packings 93*a*, 93*b*, and 93*c*, and the packings 93*a*, 93*b*, and 93*c* are pressurized toward and closely contact the first lining 91 so that invasion of sea water and foreign substances can be prevented.

Figure 10:
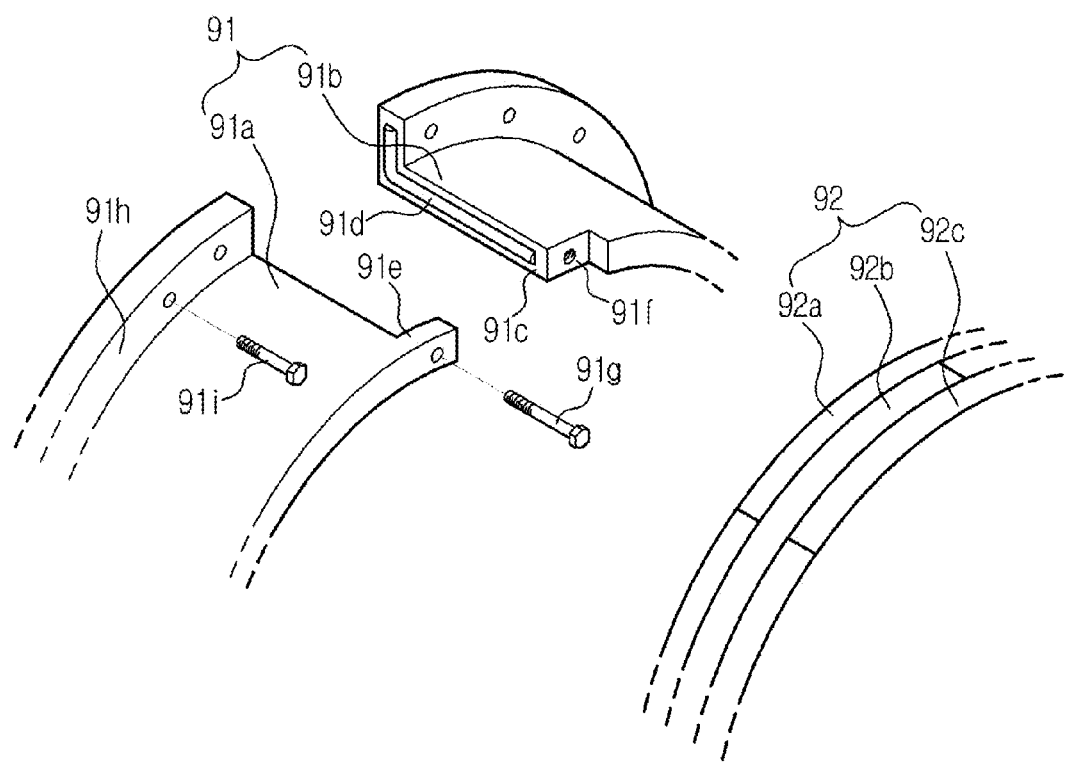
FIG. 10 is an exploded perspective view of the first sealing unit of the propulsion device according to an embodiment of the present invention.

The first lining 91 may include a first member 91*a* and a second member 91*b* that are formed by dividing both sides of the first lining 91 into semicircular forms, as illustrated in FIG. 10. A packing 91*d* may be interposed between mutually-divided portions 91*c* of the first and second members 91*a* and 91*b* so that sealing can be performed when the first and second members 91*a* and 91*b* are coupled to each other. Also, a first binding portion 91*e* is formed at a free end of a divided portion of the first member 91*a* and protrudes from one side toward an opposite side, and a second binding portion 91*f* is disposed to correspond to the second member 91*b* of the opposite side. A fixing bolt 91*g* is coupled to the second binding portion 91*f* so that the first and second members 91*a* and 91*b* can be solidly coupled to each other. A plurality of fixing bolts 91*i* may be fastened to a flange portion 91*h* fixed to the connection flange 37 and thus may be solidly fixed to the hub 11. Here, the first lining 91 is divided into both sides so that the first lining 91 can be easily installed. However, that first lining 91 is not limited thereto and may have a cylindrical shape in which the first member 91*a* and the second member 91*b* are integrally connected to each other.

A plurality of rings 92*a*, 92*b*, and 92*c* of the first sealing member 92 that are manufactured in semicircular forms are stacked in a lengthwise direction of the rotation shaft 5 from an outside of the first lining 91 and are fixed. The plurality of rings 92*a*, 92*b*, and 92*c* may be bonded to each other by bolt fastening or welding.

Figure 11:
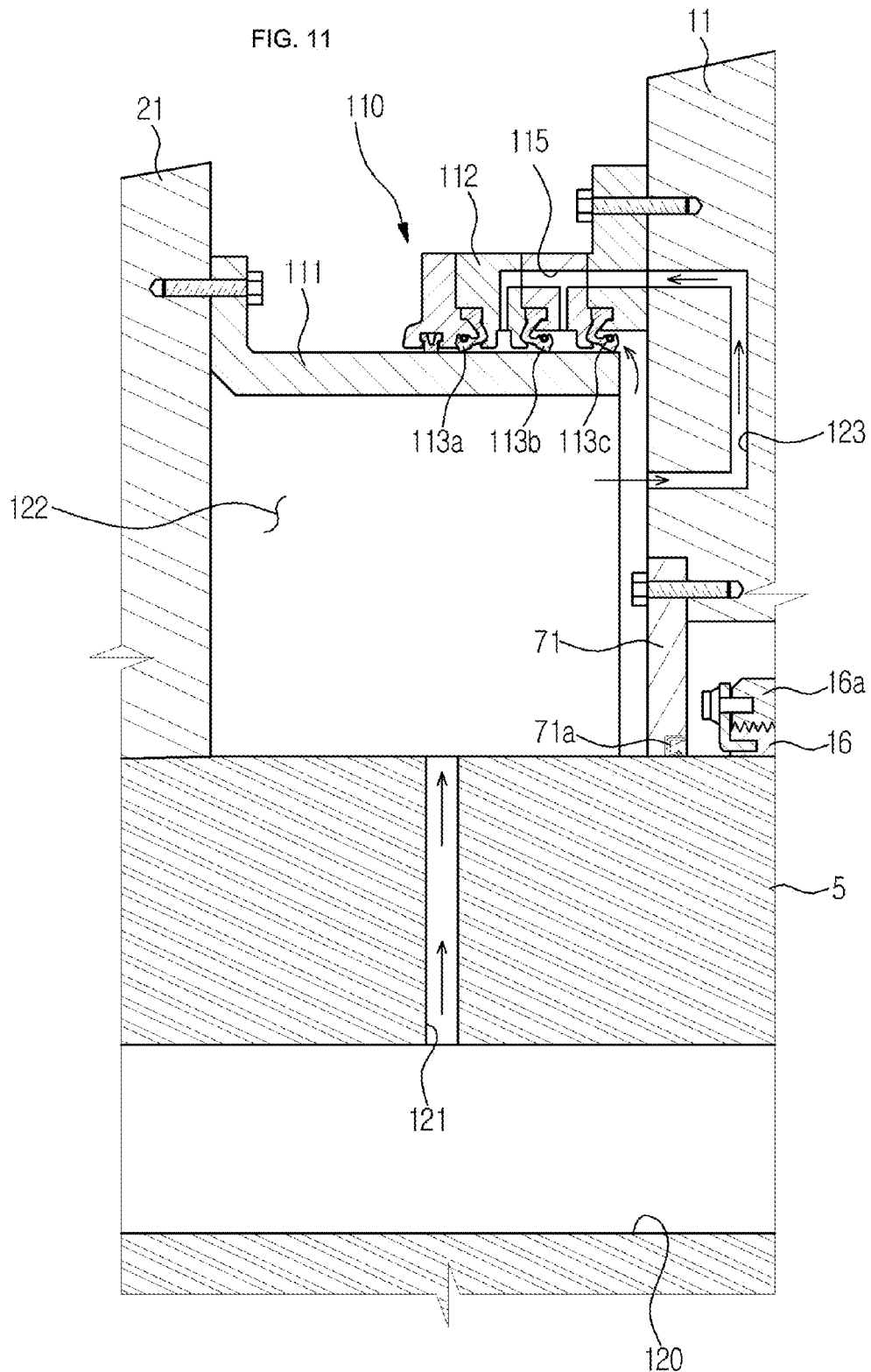
FIG. 11 is a cross-sectional view of a second sealing unit of the propulsion device according to an embodiment of the present invention.

The second sealing unit 110 may include a cylindrical, second lining 111 installed at the front surface of the hub 21 of the rear propeller 20 and a cylindrical, second sealing member 112 that covers and contacts an outer surface of the second lining 111 and has one end fixed to a rear surface of the hub 11 of the front propeller 10, as illustrated in FIG. 11. Like the first sealing member 92, the second sealing member 112 includes a plurality of packings 113*a*, 113*b*, and 113*c* installed on an inner surface of the second sealing member 112 and a flow path 115 on which the fluid is supplied into grooves among the plurality of packings 113*a*, 113*b*, and 113*c*.

The flow path 115 of the second sealing member 112 may communicate with a lubricant supplying flow path 120 disposed on a central part of the rotation shaft 5. To this end, a first connection flow path 121 may be formed in the radial direction of the rotation shaft 5 so as to connect the lubricant supplying flow path 120 and an inner space 122 of the second lining 111, and a second connection flow path 123 may be formed on the hub 11 of the front propeller 10 so as to communicate the inner space 122 of the second lining 111 with the flow path 115 of the second sealing member 112. Thus, the lubricant supplied from the central part of the rotation shaft 5 toward the second sealing member 112 may pressurize the packings 113*a*, 113*b*, and 113*c* so that sealing can be performed.

Like the first lining 91 and the first sealing member 92, the second lining 111 and the second sealing member 112 may be manufactured in semicircular forms and may be coupled to each other after the rear propeller 20 has been installed.

The front propeller 10 includes a ring-shaped, first sealing cover 71 that is mounted on the rear surface of the hub 11 so as to seal a gap between the outer surface of the rotation shaft 5 and the inner surface of the hub 11, as illustrated in FIGS. 2 and 5. The first sealing cover 71 includes a sealing member 71a that improves adhesion with an inner circumferential surface that contacts the outer surface of the rotation shaft 5. The first sealing cover 71 may prevent sea water from flowing into the gearbox 40 even when sea water invades the inner space 122 of the second lining 111 due to a problem of the second sealing unit 110. That is, the first sealing cover 71 implements a secondary barrier so that sea water can be more securely prevented from invading the gearbox 40.

Referring to FIG. 2, the second sealing cover 72 having a similar shape to that of the above-described, first sealing cover 71 may be installed at a driven flange 62 in the front of the gearbox 40 so that sealing between the driven flange 62 and the outer surface of the rotation shaft 5 can be performed. The second sealing cover 72 may prevent the lubricant filled in the gearbox 40 from leaking into the ship body 1.

The inverse rotation unit 30 may include a front sealing cover 73 that covers and seals a front surface of the front bearing 44 between the front cover 42 and the first connection member 35 and a rear sealing cover 74 that covers and seals a rear surface of the rear outer bearing 45 between the rear cover 43 and the second connection member 36. The front and rear sealing covers 73 and 74 may be disposed to have the similar shape to that of the above-described, first sealing cover 71.

The front sealing cover 73 and the rear sealing cover 74 may prevent the lubricant in the gearbox 40 from leaking into the outer side of the gearbox 40. Furthermore, like the first sealing cover 71, the rear sealing cover 74 may serve as a secondary barrier that prevents sea water from flowing into the gearbox 40 even when sea water invades an inner space of the first lining 91 due to a problem of the first sealing unit 90.

Also, the propulsion device according to the current embodiment may further include a second radial bearing 81, a third thrust bearing 82, and a fourth thrust bearing 83 that support the rotation shaft 5 in the front of the gearbox 40. The second radial bearing 81 may be fixed to the first bearing support portion 86 in the ship body 1 in a state in which the second radial bearing 81 is accommodated in the first bearing case 84. The third and fourth thrust bearings 82 and 83 may also be fixed to the second bearing support portion 87 in the ship body 1 in a state in which the third and fourth thrust bearings 82 and 83 are accommodated in the second bearing case 85 so that inner races of the third and fourth thrust bearings 82 and 83 can be supported with respect to each other.

The second radial bearing 81 supports the rotation shaft 5 in the front of the gearbox 40 so as to prevent vibration or shaking in the radial direction of the rotation shaft 5. The third and fourth thrust bearings 82 and 83 serve to transfer an axial force transferred to the rotation shaft 5 from the front and rear propellers 10 and 20, to the ship body 1. In particular, the third thrust bearing 82 serves to transfer a force that exerts on the head of the ship body 1 from the rotation shaft 5 when the ship moves forward, and the fourth thrust bearing 83 serves to transfer a force that exerts on the tail 3 of the ship body 1 from the rotation shaft 5 when the ship moves astern.

In FIG. 2, reference numeral 131 is a first covering that covers between the tail 3 of the ship body 1 outside the first sealing unit 90 and the hub 11 of the front propeller 10, and reference numeral 132 is a second covering that covers between the hub 11 of the front propeller 10 outside the second sealing unit 110 and the hub 21 of the rear propeller 20. The first covering 131 may be installed in such a way that it is fixed to the tail 3 of the ship body 1 and is spaced apart from the hub 11 of the front propeller 10 by a small distance or is fixed to the hub 11 of the front propeller 10 and is spaced a small distance apart from the tail 3 of the ship body 1 and is rotated together with the front propeller 10. The second covering 132 may be fixed to one of the hub 11 of the front propeller 10 and the hub 21 of the rear propeller 20 and may be rotated together with one to which the second covering 132 is fixed.

Next, a method of manufacturing a propulsion device according to the current embodiment and installing the propulsion device at the ship body 1 will be described.

As illustrated in FIG. 7, when the propulsion device is installed, the gearbox 40, related components and the rotation shaft 5 that constitute the inverse rotation unit 30 are assembled before the propulsion device is mounted on the ship body 1. That is, the body portion 41, the inner frame 50 to which the inversion bevel gear 33 is assembled, the driving bevel gear 31, the driven bevel gear 32, the first connection member 35, the front cover 42, the front bearing 44, the second connection member 36, the rear cover 43, and the rear outer bearing 45 are assembled at the outer side of the rotation shaft 5. The first lining 91 and the first sealing member 92 of the first sealing unit 90 are also installed between the connection flange 37 of the second connection member 36 and the rear cover 43.

Since the inverse rotation unit 30 can be assembled after each of the components is manufactured in a separate manufacturing factory, delicate manufacturing can be performed. In a general case, since the first sealing unit 90 that need to be installed after the front propeller 10 has been installed, may be mounted on the inverse rotation unit 30 in advance, a further work for installing the propulsion device at the ship body 1 can be simplified.

The rotation shaft 5 and the inverse rotation unit 30 that are assembled in the manufacturing factory, may be moved to a dock in which the ship body 1 is manufactured, using a transportation unit and then may be mounted on the tail 3 of the ship body 1. In this case, a salving device, such as a crane that may lift an assembly of the inverse rotation unit 30, may be used. When the inverse rotation unit 30 is mounted, first, the gearbox 40 of the inverse rotation unit 30 is made to enter the installation space 4 of the tail 3 of the ship body 1 from the rear of the ship body 1 in a sliding manner. The inverse rotation unit 30 is aligned so that a center of the rotation shaft 5 and a center of the main driving shaft 6 coincide with each other.

Figure 8:
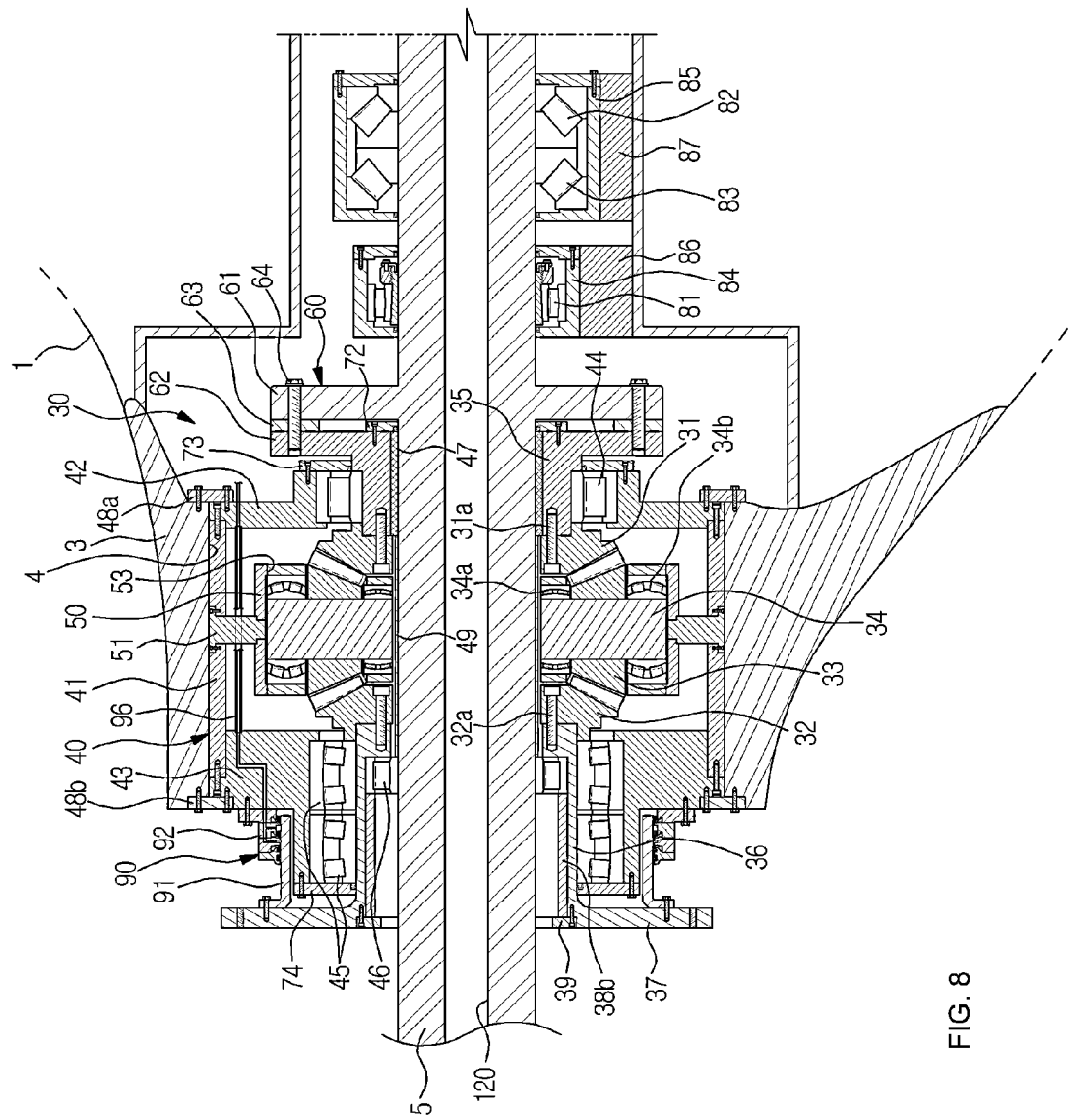
FIG. 8 is a cross-sectional view of a state in which the inverse rotation unit of the propulsion device according to an embodiment of the present invention is mounted in an installation space in a tail of a ship.

After the inverse rotation unit 30 enters the installation space 4 of the tail 3 of the ship body 1 and then is aligned, as illustrated in FIG. 8, a front fixing member 48a and a rear fixing member 48b are installed in the front and rear of the gearbox 40 so that the gearbox 40 can be fixed to the tail 3 of the ship body 1. The front and rear fixing members 48a and 48b may have a shape in which each of the front and rear fixing members 48a and 48b is divided into a plurality of parts. The front and rear fixing members 48a and 48b may be fixed to the gearbox 40 and a structure of the tail 3 of the ship body 1 by fastening a plurality of fixing bolts.

The rear fixing member 48b may be mounted when a worker approaches the rear of the ship body 1, and the front fixing member 48a may be mounted when the worker approaches an inside of the ship body 1. In this way, the inverse rotation unit 30 that is mounted in such a way such that it enters the installation space 4 of the tail 3 of the ship body 1 may be separated from the ship body 1 when a problem occurs in future, and troubleshooting may be easily performed in a state in which the inverse rotation unit 30 is separated from the ship body 1.

In the current embodiment, the front fixing member 48a and the rear fixing member 48b are fastened to the front and rear of the gearbox 40 so that the gearbox 40 can be solidly fixed to the tail 3 of the ship body 1. However, when the gearbox 40 enters the installation space 4, a state in which the outer surface of the gearbox 40 is supported at an inner surface of the installation space 4, is maintained so that the gearbox 40 can be fixed to the tail 3 of the ship body 1 by fastening only the rear fixing member 48b.

After the gearbox 40 is fixed to the tail 3 of the ship body 1, the main driving shaft 6 and the rotation shaft 5 are connected to each other by using a coupling unit 7, and the second radial bearing 81 and the third and fourth thrust bearings 82 and 83 are installed at an inside of the ship body 1 so that the rotation shaft 5 can be supported on the ship body 1.

After the inverse rotation unit 30 is mounted on the tail 3 of the ship body 1, as illustrated in FIGS. 1 and 2, the front propeller 10 and the rear propeller 20 and related components are mounted on the rotation shaft 5, and the second sealing unit 110 is mounted so that installation of the propulsion device can be completed.

Next, an operation of the propulsion device according to the current embodiment will be described.

In the propulsion device, when the rotation shaft 5 rotates by an operation of a driving source 8 inside the ship body 1, the rear propeller 20 that is directly connected to the rear end of the rotation shaft 5 is rotated together in the same direction as a direction of the rotation shaft 5. Simultaneously, the driving bevel gear 31 of the inverse rotation unit 30 is also fixed to the rotation shaft 5 and thus is rotated together with the rotation shaft 5. Since rotation of the driving bevel gear 31 is inverted by a plurality of inversion bevel gears 33 and is transferred to the driven bevel gear 32, the driven bevel gear 32 is rotated in an opposite direction to that of the rotation shaft 5. Thus, the front propeller 10 connected to the driven bevel gear 32 by using the second connection member 36 is rotated in an opposite direction to that of the rear propeller 20.

Since the front propeller 10 and the rear propeller 20 that are rotated in opposite directions have opposite wing angles, a propulsion water current is generated in the same direction. That is, when the ship moves forward, the propulsion water current is generated rearward, and when the ship moves astern, the propulsion water current is generated forwards when each of the front propeller 10 and the rear propeller 20 is rotated in a reverse direction. Also, propulsion performance of the propulsion water current generated when the ship moves forward, is improved, because the rear propeller 20 recovers rotation energy of the fluid that passes through the front propeller 10 as a propulsion force while the rear propeller 20 is rotated reversely. This also applies to a case where the ship moves astern.

Since the front propeller 10 generates a propulsion water current rearward when the ship moves forward, the front propeller 10 receives a repulsive force corresponding to the propulsion water current. The repulsive force is transferred to the rotation shaft 5 via the second thrust bearing 14 and acts as a propulsion force. Since the rear propeller 20 also generates the propulsion water current rearward when the ship moves forward, the rear propeller 20 receives the repulsive force. The repulsive force is also transferred to the rotation shaft 5 directly connected to the rear propeller 20 and acts as the propulsion force.

When the ship moves astern, the propulsion force of the front propeller 10 is transferred to the rotation shaft 5 via the first thrust bearing 13, and the propulsion force of the rear propeller 20 is also transferred to the rotation shaft 5 directly connected to the rear propeller 20.

As a result, in the propulsion device according to the current embodiment, the propulsion force that is generated by an operation of the front propeller 10 and an operation of the rear propeller 20 when the ship moves forward or moves astern is transferred to the rotation shaft 5. Since the propulsion force transferred to the rotation shaft 5 is transferred to the ship body 1 via the third and fourth thrust bearings 82 and 83, propulsion of the ship body 1 is performed.

A generator unit including coils 203 and a magnetic substance 205 is installed at the above-described propulsion device so as to produce electric energy. Here, the magnetic substance 205 may include at least one of a permanent magnet and an electromagnet. The permanent magnet itself generates a magnetic force, whereas the electromagnet requires separate electricity supply. When the magnetic substance 205 is disposed as the electromagnet, electricity supply may be performed via an electricity supply line (not shown).

Figure 12:
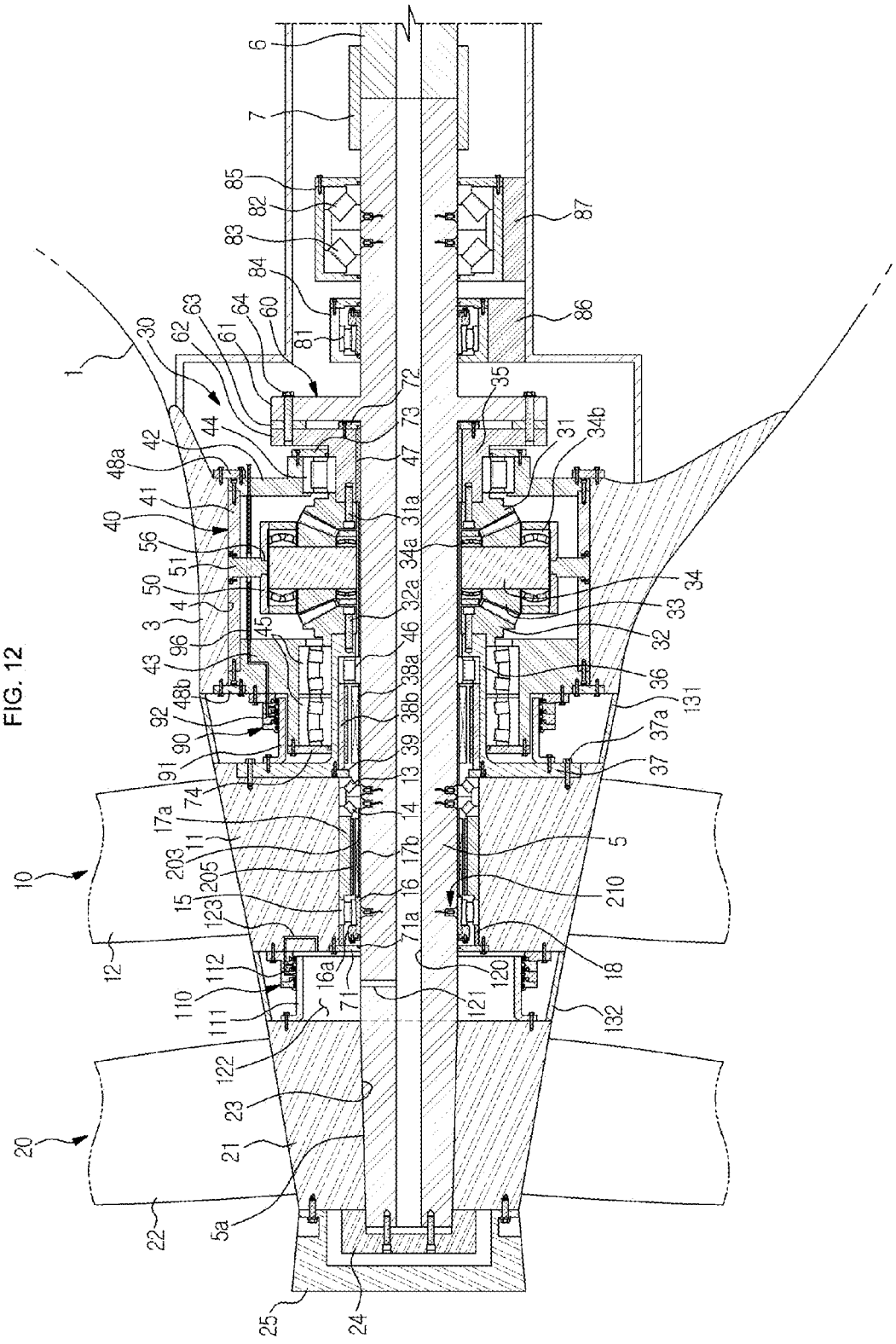
FIG. 12 illustrates a propulsion device having a generator unit according to an embodiment of the present invention.

Referring to FIG. 12, the coils 203 and the magnetic substance 205 are installed between the hub 11 of the front propeller 10 and the rotation shaft 5 so as to face each other so that, when the rotation shaft 5 rotates, electric energy can be generated by opposite rotation of the coils 203 and the magnetic substance 205.

In this case, the coils 203 may be installed to be wound along an inner circumferential surface and an outer circumferential surface of a first inner support ring 17b, and the magnetic substance 205 may be installed at an inside of a first outer support ring 17a so as to face the coils 203. Here, the first outer support ring 17a and the first inner support ring 17b are disposed in a cylindrical shape between the hub 11 of the front propeller 10 and the rotation shaft 5, as described above. That is, the first outer support ring 17a is interposed between an outer race of the second thrust bearing 14 and an outer race of the first radial bearing 15 so that the second thrust bearing 14 and the first radial bearing 15 can be supported with respect to each other. The first inner support ring 17b is interposed between an inner race of the second thrust bearing 14 and an inner race of the first radial bearing 15 so that the second thrust bearing 14 and the first radial bearing 15 can be supported with respect to each other.

Also, the coils 203 may be installed to be wound along an outer circumferential surface and an inner circumferential surface of the second inner support ring 38a, and the magnetic substance 205 may be installed at an inside of the second outer support ring 38b so as to face the coils 203. Here, the second inner support ring 38a and the second outer support ring 38b are disposed in the cylindrical shape between the second connection member 36 and the outer surface of the rotation shaft 5, as described above. That is, the second inner support ring 38a is interposed between an inner race of the rear inner bearing 46 and an inner race of the first thrust bearing 13 so that a predetermined distance between the rear inner bearing 46 and the first thrust bearing 13 can be maintained, and the second outer support ring 38b is installed at an inner surface of the second connection member 36 so as to support the outer race of the rear inner bearing 46. The second connection member 36 is rotatably supported at an outer side of the rotation shaft 5 and connects the driven bevel gear and the hub 11 of the front propeller 10. The rear inner bearing 46 is installed between the inner surface of the second connection member 36 and the rotation shaft 5.

The above-described magnetic substance 205 may be installed so that the whole of the magnetic substance 205 can be fully buried in the outer support rings 17a and 38b or only a part thereof can be buried in the outer support rings 17a and 38b and the remaining part thereof can protrude.

In this way, opposite rotation of the coils 203 and the magnetic substance 205 that are installed to face each other is performed when the rotation shaft 5 rotates, and a magnetic force generated in the magnetic substance 205 is disconnected by the coils 203 so that electricity is generated. In this case, productivity and efficiency of the electric energy can be improved by opposite rotation. The electric energy produced by the generator unit may be used as an energy source of various equipment within the ship. For example, when a unit to be supplied to a power distributor in the ship or a unit for inspecting various equipment of the propulsion device is mounted, the electric energy may be supplied to a corresponding unit.

Hereinafter, for understanding of the current embodiment, it is illustrated that the electric energy produced by opposite rotation of the coils 203 wound along the outer circumferential surface and the inner circumferential surface of the first inner support ring 17b and the magnetic substance 205 installed at the inside of the first outer support ring 17a is utilized. However, embodiments of the present invention are not limited thereto. It will be obvious that the electric energy generated by opposite rotation of the coils 203 wound along the outer circumferential surface and the inner circumferential surface of the second inner support ring 38a and the magnetic substance 205 installed at the inside of the second outer support ring 38b so as to face the coils 203, as described in FIG. 12, may be utilized.

Figure 13:
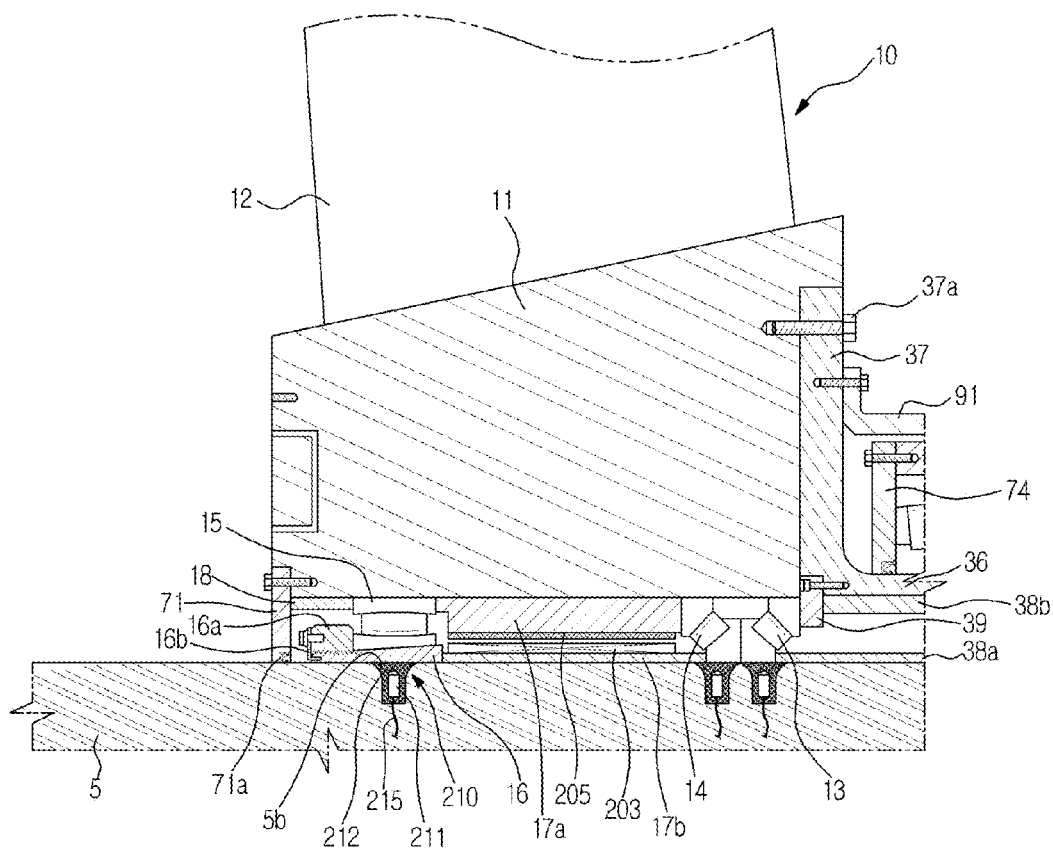
FIG. 13 illustrates an example in which electric energy generated by the generator unit of FIG. 12 is utilized in a measurement unit for monitoring an operating state of each bearing.

Referring to FIGS. 12 and 13, in order to monitor operating states of the bearings 13 to 15 and 81 to 83, which are respectively interposed between the hub 11 of the front propeller 10 and the rotation shaft 5 and interposed between the rotation shaft 5 and the ship body 1, a measurement unit 210 may be installed at the rotation shaft 5 that is adjacent to each of the bearings 13 to 15 and 81 to 83. Here, the measurement unit 210 may be disposed to have the number corresponding to the number of bearings 13 to 15 and 81 to 83.

For conveniences of explanation, FIG. 13 is an enlarged view of a shape in which the measurement unit 210 is installed at the rotation shaft 5 adjacent to each of the bearings 13 to 15 so as to monitor the operating states of the bearings 13 to 15 interposed between the hub 11 of the front propeller 10 and the rotation shaft 5.

Figure 14:
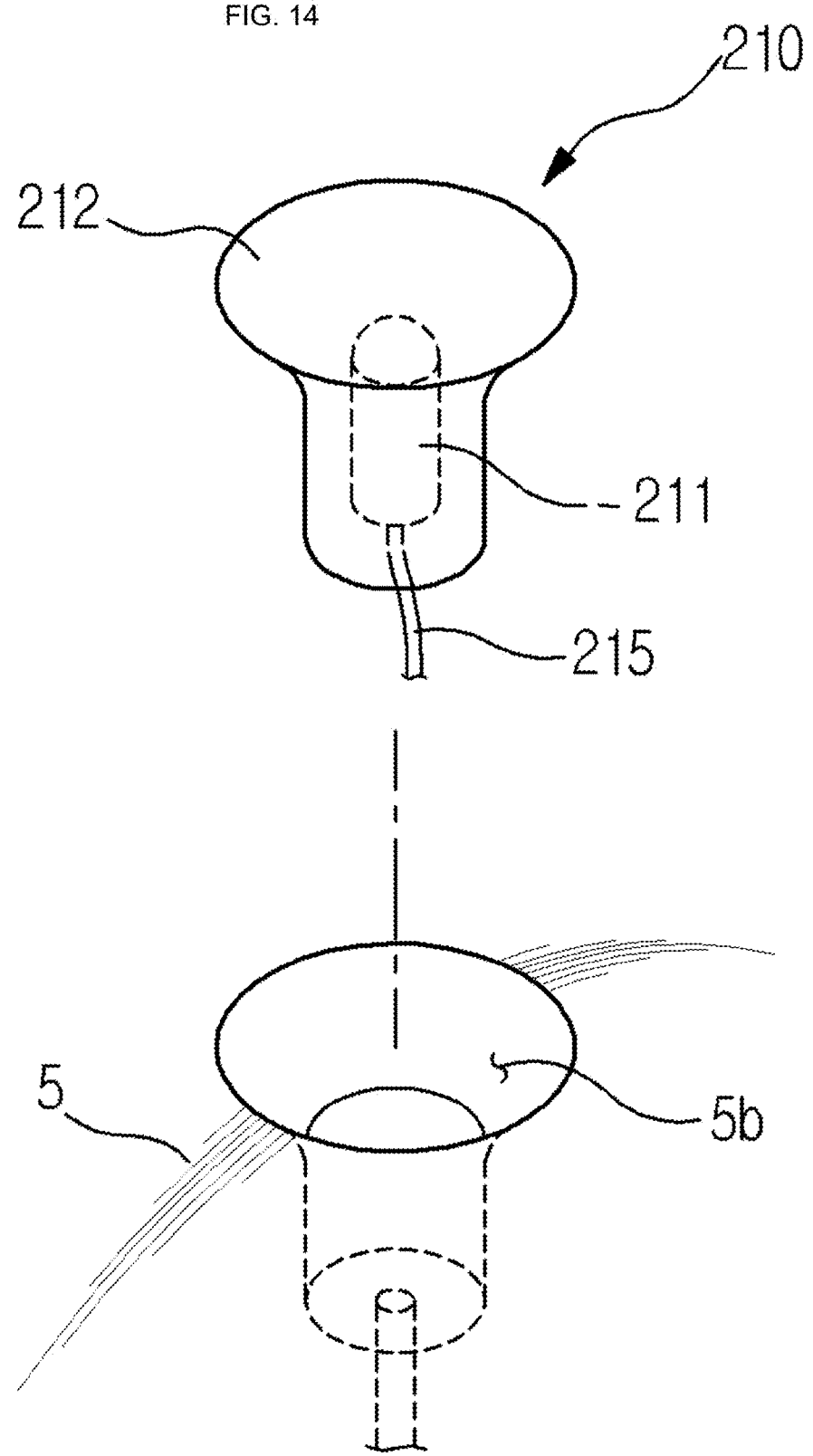
FIG. 14 is an exploded perspective view of the measurement unit of FIG. 13.

Referring to FIGS. 12 through 14, the measurement unit 210 includes a sensor 211 that measures a change in temperatures of the bearings 13 to 15 and 81 to 83 and an adaptor 212 in which a sensor 211 is embedded. In this case, the electric energy produced by opposite rotation of the coils 203 and the magnetic substance 205 may be supplied as an energy source of the sensor 211 via an electricity supply line (not shown).

Here, the adaptor 212 may be formed in a bell mouth shape and may be mounted to be buried in a coupling groove 5b of the rotation shaft 5 or may be disposed as an integral body with the rotation shaft 5. In this case, the coupling groove 5b may be formed to correspond to the exterior of the adaptor 212. The adaptor 212 with the sensor 211 is disposed in the bell mouth shape on the rotation shaft 5 so that stress can be prevented from being concentrated on the adaptor 212 and thus strength of the rotation shaft 5 can be effectively maintained.

Also, the adaptor 212 may be formed of a metallic material and may transfer thermal energy generated in each of the bearings 13 to 15 and 81 to 83 to the sensor 211. The adaptor 212 may be formed of a metallic material having high thermal conductivity compared to a material for forming the rotation shaft 5. For example, the adaptor 212 may be formed of at least one metallic material selected from the group consisting of Al, Cr, Ti, Cu, and Au or a combination of two or more metallic materials. In this way, the adaptor 212 with the sensor 211 is formed of the metallic material having high thermal conductivity so that a change in temperatures of the bearings 13 to 15 and 81 to 83 can be effectively measured using the sensor 211 without the need of the sensor 211 that directly contacts each of the bearings 13 to 15 and 81 to 83.

Measurement values of a change in temperatures of the bearings 13 to 15 and 81 to 83 measured by the sensor 211 may be converted into electric signals and may be provided to a monitoring unit (220, see FIG. 15) that will be described later. To this end, a connection cable 215 that is connected to the sensor 211 and transfers the measurement values of the change in temperatures of the bearings 13 to 15 and 81 to 83 to the outside may be provided. Here, when there are a plurality of connection cables 215, a multi-channel slip ring (not shown) may be used so that the plurality of connection cables 215 may not get tangled. The connection cable 215 may be connected to the monitoring unit 220 that will be described later, through an inner space of the rotation shaft 5. In this case, when data transmission is performed in a wireless manner, the connection cable 215 may be omitted.

Figure 15:
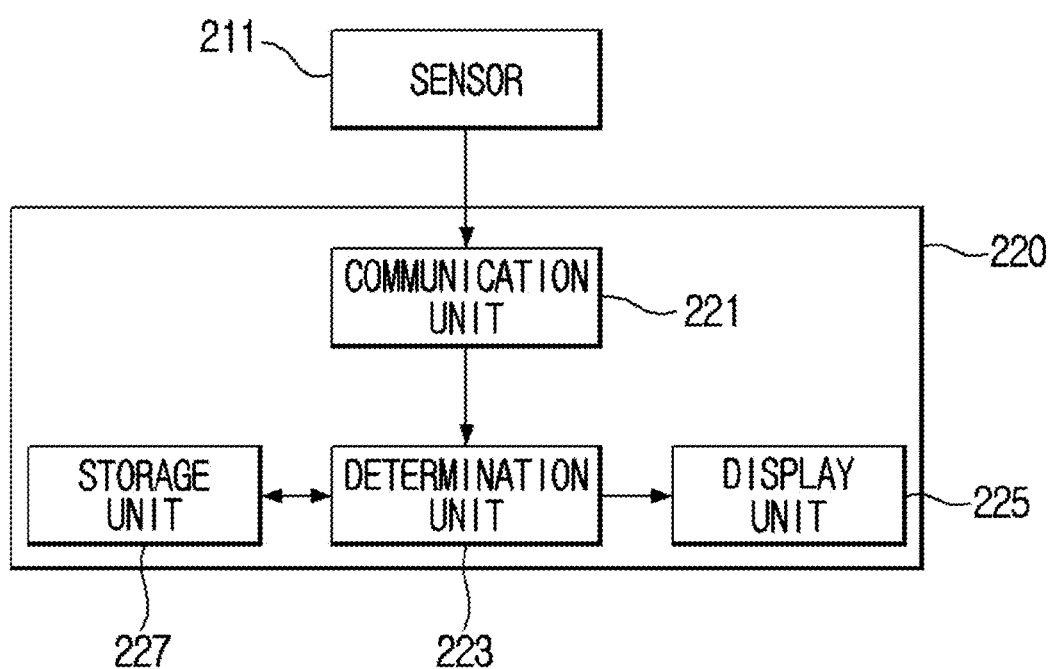
FIG. 15 is a block diagram of a monitoring unit for monitoring operating states of bearings based on information measured by the measurement unit to which the electric energy produced by the generator unit of FIG. 12 is supplied as an energy source.

Referring to FIG. 15, the monitoring unit 220 may monitor operating states of at least one among the bearings 13 to 15 and 81 to 83 based on the measurement values of the change in temperatures of the bearings 13 to 15 and 81 to 83 that are received from the sensor 211. To this end, the monitoring unit 220 includes a communication unit 221, a determination unit 223, a display unit 225, and a storage unit 227.

The communication unit 221 receives the measurement values of the change in temperatures of the bearings 13 to 15 and 81 to 83 that are measured by the sensor 211. The communication unit 221 processes the received measurement values of the change in temperatures of the bearings 13 to 15 and 81 to 83 and transmits the processed values to the determination unit 223 that will be described later.

The determination unit 223 compares the measurement values of the change in temperatures of the bearings 13 to 15 and 81 to 83 received from the communication unit 221 with reference values and determines whether operations of the bearings 13 to 15 and 81 to 83 are maintained in a normal state based on the result of comparison. In this case, the determination unit 223 may determine whether each of the bearings 13 to 15 and 81 to 83 operates normally.

For example, when the measurement values (ranges) of the change in temperatures of the bearings 13 to 15 and 81 to 83 are included in the reference values (ranges), the determination unit 223 determines that the operations of the bearings 13 to 15 and 81 to 83 are maintained in the normal state. On the other hand, when the measurement values of the change in temperatures of the bearings 13 to 15 and 81 to 83 exceed the reference values, the determination unit 223 determines that the operations of the bearings 13 to 15 and 81 to 83 are being performed in an abnormal state.

Here, the operations of the bearings 13 to 15 and 81 to 83 that are maintained in the normal state mean that the bearings 13 to 15 and 81 to 83 are normally performing all functions. Also, the operations of the bearings 13 to 15 and 81 to 83 that are maintained in the abnormal state mean that the bearings 13 to 15 and 81 to 83 are severely damaged due to abrasion and are not normally performing all functions.

Next, the display unit 225 displays at least one of the measurement values of the change in temperatures of the bearings 13 to 15 and 81 to 83 and the comparison result on a screen. Thus, it may be identified in real time whether the operations of the bearings 13 to 15 and 81 to 83 are maintained in the normal state. Also, when damage occurs in at least one among the bearings 13 to 15 and 81 to 83, action can be rapidly taken against the damage.

The storage unit 227 stores the reference values (ranges) that are bases for determining the operating states of the bearings 13 to 15 and 81 to 83 based on the measurement values of the change in temperatures of the bearings 13 to 15 and 81 to 83. Also, the storage unit 227 may store the measurement values of the change in temperatures of the bearings 13 to 15 and 81 to 83 received from the communication unit 221, various algorithms for processing the measurement values, and information about structures of the bearings 13 to 15 and 81 to 83. The storage unit 227 may be implemented as at least one selected from the group consisting of a cache, a read only memory (ROM), a programmable ROM (PROM), an erasable programmable ROM (EPROM), an electrically erasable programmable ROM (EEPROM), a nonvolatile memory device, such as a flash memory, a volatile memory device, such as a random access memory (RAM), and a storage medium, such as a hard disk drive (HDD) or a CD-ROM. However, embodiments of the present invention are not limited thereto.

Each of the elements shown in FIG. 15 may be configured as a kind of 'module'. Here, the 'module' refers to software or a hardware element, such as a field programmable gate array (FPGA) or an application specific integrated circuit (ASIC). The module performs certain roles. However, the module is not limited to software or hardware. The module may be configured in a storage medium that may address or may be configured to execute one or more processors. Functions provided by the elements and modules may be coupled to a smaller number of elements or modules or may be further divided into additional elements and modules.

While the invention has been shown and described with reference to certain exemplary embodiments thereof, it will be understood by those skilled in the art that various changes in form and details may be made therein without departing from the spirit and scope of the invention as defined by the appended claims.

The invention claimed is:

1. A propulsion device for a ship, comprising:
   a rear propeller fixed to a rotation shaft;
   a front propeller that is rotatably supported on the rotation shaft in the front of the rear propeller;
   at least one bearing interposed in at least one of spaces between a hub of the front propeller and the rotation shaft and between the rotation shaft and a ship body; and
   an inverse rotation unit that inverts rotation of the rotation shaft, transfers the inverted rotation to the front propeller and comprises a gearbox that is accommodated in an installation space formed in a tail of the ship body in a state in which a plurality of gears for implementing inversion of the front propeller are embedded,
   wherein at least one measurement unit for measuring operating states of the at least one bearing is mounted to the rotation shaft,
   wherein the at least one bearing comprises:
   first and second thrust bearings that support thrust loads applied to the rotation shaft from the front propeller;
   a first radial bearing that supports a radial load applied to the rotation shaft from the front propeller;
   a second radial bearing that is respectively installed between the rotation shaft and the ship body and supports the rotation shaft in the front of the gearbox; and
   at least one of third and fourth thrust bearings that transfer axial forces transferred from the front propeller and the rear propeller to the rotation shaft toward the ship body,
   wherein the propulsion device further comprises a generator unit that comprises coils and a magnetic substance installed between the hub of the front propeller and the rotation shaft so as to face each other and that generates electric energy due to opposite rotation of the coils and the magnetic substance when the rotation shaft rotates, and
   wherein the electric energy is supplied as an energy source of the measurement unit.

2. The propulsion device of claim 1, wherein the measurement unit comprises:
   a sensor that measures a change in temperatures of the at least one bearing; and
   an adaptor in which the sensor is embedded.

3. The propulsion device of claim 2, wherein the adaptor is formed of a metallic material having thermal conductivity, is disposed in a bell mouth shape, is mounted in a coupling groove formed in the rotation shaft or is disposed as an integral body with the rotation shaft.

4. The propulsion device of claim 2, further comprising a connection cable that is connected to the sensor and transfers measurement values of the change in temperatures of the at least one bearing to a monitoring unit.

5. The propulsion device of claim 2, further comprising:
   a communication unit that receives the measurement values of the change in temperatures of the at least one bearing from the sensor;
   a determination unit that determines whether operations of the at least one bearing are maintained in a normal state based on the received measurement values of the change in temperatures of the at least one bearing; and
   a display unit that displays at least one of the measurement values of the change in temperatures of the at least one bearing and a value of the determination result on a screen.

6. The propulsion device of claim 1, wherein the magnetic substance comprises at least one of a permanent magnet and an electromagnet.

7. The propulsion device of claim 1, further comprising a cylindrical, first outer support ring and a cylindrical, first inner support ring that are respectively installed between the hub of the front propeller and the rotation shaft,
   wherein the first outer support ring is interposed between an outer race of the second thrust bearing and an outer race of the first radial bearing so that the second thrust bearing and the first radial bearing are supported with respect to each other, and
   the first inner support ring is interposed between an inner race of the second thrust bearing and an inner race of the first radial bearing so that the second thrust bearing and the first radial bearing are supported with respect to each other.

8. The propulsion device of claim 7, wherein the plurality of gears comprise:
a driving bevel gear connected to the gearbox so as to be rotated together with the rotation shaft;
a driven bevel gear that is rotatably supported around the rotation shaft and is connected to the hub of the front propeller; and
at least one inversion bevel gear that inverts rotation of the driving bevel gear and transfers inverted rotation to the driven bevel gear.

9. The propulsion device of claim 8, further comprising:
a connection member that is rotatably supported on an outer side of the rotation shaft and connects the driven bevel gear and the hub of the front propeller; and
a rear inner bearing installed between an inner surface of the connection member and the rotation shaft.

10. The propulsion device of claim 9, further comprising a cylindrical, second inner support ring and a cylindrical, second outer support ring that are disposed between the connection member and the outer surface of the rotation shaft and support the rear inner bearing,
wherein the second inner support ring is interposed between an inner race of the rear inner bearing and an inner race of the first thrust bearing and maintains a distance therebetween, and
the second outer support ring is installed at an inner surface of the connection member so as to support an outer race of the rear inner bearing.

11. The propulsion device of claim 10, wherein the coils are wound along an outer circumferential surface and an inner circumferential surface of the second inner support ring, and
the magnetic substance is installed at an inside of the second outer support ring so as to face the coils.

12. The propulsion device of claim 7, wherein the coils are wound along an outer circumferential surface and an inner circumferential surface of the first inner support ring, and
the magnetic substance is installed at an inside of the first outer support ring so as to face the coils.

13. A ship comprising the propulsion device according to claim 1.

* * * * *